US012048070B2

(12) United States Patent
Ooyama et al.

(10) Patent No.: US 12,048,070 B2
(45) Date of Patent: Jul. 23, 2024

(54) DIRECT RESISTANCE HEATING APPARATUS, DIRECT RESISTANCE HEATING METHOD, HEATING APPARATUS, HEATING METHOD, AND HOT-PRESS MOLDING METHOD

(71) Applicant: NETUREN CO., LTD., Tokyo (JP)

(72) Inventors: Hironori Ooyama, Tokyo (JP); Kunihiro Kobayashi, Tokyo (JP); Tokio Sekigawa, Tokyo (JP); Fumiaki Ikuta, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 1080 days.

(21) Appl. No.: 16/638,653

(22) PCT Filed: Sep. 7, 2018

(86) PCT No.: PCT/JP2018/033300

§ 371 (c)(1),
(2) Date: Feb. 12, 2020

(87) PCT Pub. No.: WO2019/050016

PCT Pub. Date: Mar. 14, 2019

(65) Prior Publication Data

US 2020/0367321 A1 Nov. 19, 2020

(30) Foreign Application Priority Data

Sep. 11, 2017 (JP) ................................ 2017-174053

(51) Int. Cl.
*H05B 3/06* (2006.01)
*C21D 1/40* (2006.01)
*H05B 3/03* (2006.01)

(52) U.S. Cl.
CPC ................ *H05B 3/03* (2013.01); *C21D 1/40* (2013.01); *H05B 3/06* (2013.01)

(58) Field of Classification Search
CPC ........ C21D 1/40; C21D 1/673; C21D 9/0018; C21D 9/48; H05B 3/02; H05B 3/03; H05B 3/06; B21D 22/02; B21D 22/20
(Continued)

(56) References Cited

U.S. PATENT DOCUMENTS

2014/0339210 A1* 11/2014 Kobayashi ............. H05B 1/023 219/162
2015/0173125 A1 6/2015 Ooyama et al.
(Continued)

FOREIGN PATENT DOCUMENTS

JP 53-7517 1/1978
JP 6-79389 3/1994
(Continued)

OTHER PUBLICATIONS

International Search Report, issued Nov. 28, 2018 in corresponding International Application No. PCT/JP2018/033300.

*Primary Examiner* — Quang T Van
(74) *Attorney, Agent, or Firm* — Wenderoth, Lind & Ponack, L.L.P.

(57) ABSTRACT

A direct resistance heating apparatus includes first and second electrodes arranged with a space provided therebetween, a power supply electrically connected to the electrodes, an electrode moving mechanism configured to move, in a state in which the electrodes are in contact with a workpiece and in a state in which current is applied from the power supply to the workpiece through the electrodes, at least one of the electrodes along an opposing direction in which the electrodes are opposed to each other, first and second holders configured to hold the workpiece such that, in a state in which the at least one of the electrodes is moved, a heating target region of the workpiece located between the electrodes is held between the holders in the opposing
(Continued)

direction, and a holder moving mechanism configured to move at least one of the holders to pull the workpiece along the opposing direction.

20 Claims, 20 Drawing Sheets

(58) Field of Classification Search
USPC ...... 219/50, 61.4, 69.15; 373/36, 38, 41, 49, 373/50, 52, 69, 88
See application file for complete search history.

(56) References Cited

U.S. PATENT DOCUMENTS

| | | | |
|---|---|---|---|
| 2015/0173126 | A1 | 6/2015 | Ooyama et al. |
| 2015/0208466 | A1 | 7/2015 | Ooyama et al. |
| 2016/0136712 | A1 | 5/2016 | Ooyama et al. |
| 2017/0314094 | A1 | 11/2017 | Ooyama et al. |
| 2018/0029103 | A1 | 2/2018 | Ooyama et al. |
| 2018/0124872 | A1 | 5/2018 | Ooyama et al. |
| 2019/0030584 | A1 | 1/2019 | Ooyama et al. |

FOREIGN PATENT DOCUMENTS

| | | | |
|---|---|---|---|
| JP | 3587501 | 8/2004 | |
| JP | 2013-114941 | 6/2013 | |
| JP | 2013-114942 | 6/2013 | |
| JP | 2013-251209 | 12/2013 | |
| JP | 2014-15658 | 1/2014 | |
| JP | 2014-31566 | 2/2014 | |
| JP | 2014-233757 | 12/2014 | |
| JP | 2016-97424 | 5/2016 | |
| JP | 2016-162727 | 9/2016 | |
| WO | WO-2006067964 A1 * | 6/2006 | ............ B29C 33/68 |
| WO | 2013/081180 | 6/2013 | |
| WO | 2013/180313 | 12/2013 | |
| WO | 2014/010712 | 1/2014 | |
| WO | 2014/196647 | 12/2014 | |
| WO | 2015/199239 | 12/2015 | |
| WO | 2016/079998 | 5/2016 | |
| WO | 2016/139944 | 9/2016 | |

* cited by examiner

DIRECT RESISTANCE HEATING APPARATUS, DIRECT RESISTANCE HEATING METHOD, HEATING APPARATUS, HEATING METHOD, AND HOT-PRESS MOLDING METHOD

TECHNICAL FIELD

The present invention relates to a direct resistance heating apparatus, a direct resistance heating method, a heating apparatus, a heating method, and a hot-press molding method.

BACKGROUND ART

Heat treatment is applied to, for example, vehicle structures, such as a center pillar and a reinforcement, to improve strength. Heat treatment can be classified into two types, indirect heating and direct heating. An example of indirect heating is a furnace heating in which a workpiece is placed inside a furnace and the temperature of the furnace is controlled to heat the workpiece. Examples of direct heating include an induction heating in which eddy current is applied to a workpiece to heat the workpiece, and a direct resistance heating in which current is applied directly to a workpiece to heat the workpiece.

According to a first related art (see, e.g., JPH06-79389A), a metal blank is passed through heating means and heated by induction heating or direct resistance heating so as to improve workability of the metal blank prior to being subjected to plastic working. For example, the heating means including an induction coil or electrode rollers is arranged upstream of a cutter machine, and in the case of the electrode rollers, the metal blank is subjected to direct resistance heating by the electrode rollers while at the same time being continuously conveyed by the electrode rollers.

In order to heat a flat steel plate having a substantially equal width along the longitudinal direction by direct resistance heating, voltage may be applied between electrodes arranged at longitudinal ends of the steel plate respectively. In this case, because current flows uniformly through the steel plate, amount of heat generated is uniform over the entire steel plate.

According to a second related art (see, e.g., JP3587501B2), a steel plate having a varying width along a longitudinal direction of the steel plate is heated by arranging a plurality of pairs of electrodes side by side along the longitudinal direction, each pair of electrodes having one electrode disposed on one side of the steel plate and another electrode disposed on the opposite side of the steel plate in the widthwise direction of the steel plate, and applying equal current between each pair of electrodes, so that the steel plate is heated to a uniform temperature.

According to a third related art (see, e.g., JPS53-07517A), one electrode is fixed to one end of a steel rod, and a clamping-type second electrode is provided at a boundary between a heating target portion of the steel rod and a non-heating portion of the steel rod, so that the steel rod is partially heated.

When heating a steel workpiece having a varying width along its longitudinal direction, it is generally desirable to make the amount of heat applied per unit volume of the steel workpiece to be uniform over the entire steel workpiece, like in furnace heating. However, furnace heating requires large-scale equipment, and temperature control of the furnace is difficult.

Accordingly, direct resistance heating is preferable in terms of production cost. However, when a plurality of pairs of electrodes is provided as in the first related art, amount of current applied is controlled for each pair of electrodes, which increases equipment cost. Further, arranging a plurality of pairs of electrodes with respect to one workpiece results in low productivity.

SUMMARY

Illustrative aspect of the present invention provide a direct resistance heating apparatus, a direct resistance heating method, a heating apparatus, and a heating method capable of uniformly heating a workpiece or heating a workpiece to have a desired temperature distribution, reducing cost, and improving productivity, and also provide a hot-press molding method in which the direct resistance heating method and the heating method can be used.

According to an illustrative aspect of the present invention, a direct resistance heating apparatus includes a first electrode and a second electrode arranged to oppose to each other with a space provided between the first electrode and the second electrode, a power supply electrically connected to the first electrode and the second electrode, an electrode moving mechanism configured to move, in a state in which the first electrode and the second electrode are in contact with a workpiece and in a state in which current is applied from the power supply to the workpiece through the first electrode and the second electrode, at least one of the first electrode and the second electrode along an opposing direction in which the first electrode and the second electrode are opposed to each other, a first holder and a second holder configured to hold the workpiece such that, in a state in which the at least one of the first electrode and the second electrode is moved, a heating target region of the workpiece located between the first electrode and the second electrode is held between the first holder and the second holder in the opposing direction, and a holder moving mechanism configured to move at least one of the first holder and the second holder to pull the workpiece along the opposing direction.

According to another illustrative aspect of the present invention, a heating apparatus is configured to heat a plate workpiece having a first heating target region and a second heating target region is provided. A sectional area of the first heating target region is substantially constant along a longitudinal direction of the first heating target region or monotonically increases or decreases along the longitudinal direction. The second heating target region is adjoining a portion of the first heating target region in a width direction of the first heating target region in a monolithic manner. The heating apparatus includes a first heating section configured to heat the first heating target region, and a second heating section configured to heat the second heating target region. The first heating section includes the direct resistance heating apparatus described above. At least one of the first electrode and the second electrode of the direct resistance heating apparatus is moved on the first heating target region in the longitudinal direction.

According to another illustrative aspect of the present invention, another heating apparatus configured to heat a plate workpiece having a first heating target region and a second heating target region is provided. A sectional area of the first heating target region is substantially constant along a longitudinal direction of the first target heating region or monotonically increases or decreases along the longitudinal direction. The second heating target region is adjoining the first heating target region in the longitudinal direction in a monolithic manner. The second heating target region is wider than the first heating target region. The heating apparatus includes a partial heating section configured to heat the second heating target region, and an overall heating section configured to heat the first heating target region and the second heating target region. The overall heating section includes the direct resistance heating apparatus described above. At least one of the first electrode and the second electrode of the direct resistance heating apparatus is moved in the longitudinal direction of the plate workpiece.

According to another illustrative aspect of the present invention, a direct resistance heating method includes heating a workpiece by direct resistance heating, and flattening the workpiece that has been expanded due to the direct resistance heating by pulling the workpiece. The direct resistance heating includes moving at least one of a first electrode and a second electrode arranged to oppose to each other with a space provided between the first electrode and the second electrode, along an opposing direction in which the first electrode and the second electrode are opposed to each other, in a state in which the first electrode and the second electrode are in contact with the workpiece and in a state in which current is applied to the workpiece through the first electrode and the second electrode. The pulling of the workpiece includes holding the workpiece by a first holder and a second holder such that, in a state in which the at least one of the first electrode and the second electrode is moved, a heating target region of the workpiece located between the first electrode and the second electrode is held between the first holder and the second holder in the opposing direction, and moving at least one of the first holder and the second holder along the opposing direction.

According to another illustrative aspect of the present invention, a heating method for heating a plate workpiece having a first heating target region and a second heating target region is provided. A sectional area of the first heating target region is substantially constant along a longitudinal direction of the first heating target region or monotonically increases or decreases along the longitudinal direction. The second heating target region is adjoining a portion of the first heating target region in a width direction of the first heating target region. The heating method includes heating the second heating target region, and after the heating of the second heating target region, heating the first heating target region by the direct resistance heating method described above to heat the first heating target region and the second heating target region to be within a predetermined temperature range. The at least one of the first electrode and the second electrode is moved in the longitudinal direction.

According to another illustrative aspect of the present invention, a heating method for heating a plate workpiece having a first heating target region and a second heating target region is provided. A width of the first heating target region is substantially constant along a longitudinal direction of the first heating target region or monotonically increases or decreases along the longitudinal direction. The second heating target region is adjoining the first heating target region in the longitudinal direction in a monolithic manner. The second heating target region is wider than the first heating target region. The heating method includes heating the second heating target region, and after the heating of the second heating target region, heating the first heating target region and the second heating target region by the direct resistance heating method described above to heat the first heating target region and the second heating target region to be within a predetermined temperature range. The at least one of the first electrode and the second electrode is moved in the longitudinal direction.

According to another illustrative aspect of the present invention, a hot-press molding method includes heating the heating target region of the workpiece by the direct resistance heating method described above, and pressing the workpiece by a press mold.

According to another illustrative aspect of the present invention, a hot-press molding method includes heating the first heating target region and the second heating target region of the plate workpiece by the heating method described above, and pressing the workpiece by a press mold.

BRIEF DESCRIPTION OF DRAWINGS

FIG. 1F is a diagram illustrating the direct resistance heating apparatus and the direct resistance heating method together with FIGS. 1A to 1E.

EMBODIMENTS OF INVENTION

Hereinafter, embodiments of the present invention will be described with reference to the drawings.

FIGS. 1A to 1F schematically illustrate a direct resistance heating apparatus and a direct resistance heating method according to an embodiment of the present invention.

Figure 1A:
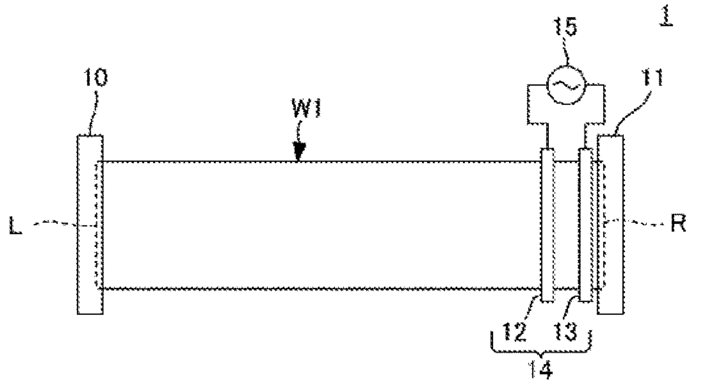
FIG. 1A is a diagram illustrating a direct resistance heating apparatus and a direct resistance heating method according to an embodiment of the present invention.

A workpiece W1 illustrated in FIG. 1A is a plate workpiece formed as a single-piece member, and is, for example, a steel plate. The workpiece W1 is formed into a substantially rectangular shape having constant thickness and width and the entire region thereof is a region to be heated (hereinafter, heating target region).

A direct resistance heating apparatus 1 for heating the workpiece W1 by direct resistance heating includes a first holder 10 and a second holder 11 each of which configured to hold the workpiece W1, a pair of electrodes 14 including a first electrode 12 and a second electrode 13, a power supply 15 electrically connected to the pair of electrodes 14, an electrode moving mechanism 16, a holder moving mechanism 17, and a controller 18. The controller 18 may include at least one processor and at least one memory.

The first holder 10 is arranged on one end portion L of the workpiece W1 in the longitudinal direction, and the second holder 11 is arranged on the other end portion R of the workpiece W1 in the longitudinal direction to hold a heating target region of the workpiece W1 between the first holder 10 and the second holder.

The first electrode 12 and the second electrode 13 are arranged between the first holder 10 and the second holder 11 to be spaced apart from each other in the longitudinal direction of the workpiece W1, the first electrode 12 is arranged on the first holder 10 side, and the second electrode 13 is arranged on the second holder 11 side.

The power supply 15 is electrically connected to the first electrode 12 and the second electrode 13 and supplies current to the pair of electrodes 14 including the first electrode 12 and the second electrode 13. The power supply 15 may be a DC power supply or an AC power supply. The current supplied from the power supply 15 to the pair of electrodes 14 is controlled by the controller 18.

The electrode moving mechanism 16 has a first moving unit 20 which moves the first electrode 12, and a second moving unit 21 which moves the second electrode 13. The first moving unit 20 can move the first electrode 12 in the longitudinal direction of the workpiece W1 while being in contact with the first electrode 12 and the workpiece W1. In the same manner, the second moving unit 21 can move the second electrode 13 in the longitudinal direction of the workpiece W1 while being in contact with second electrode 13 and the workpiece W1. The movement of the first electrode 12 by the first moving unit 20 and the movement of the second electrode 13 by the second moving unit 21 are controlled by the controller 18.

The holder moving mechanism 17 moves the second holder 11 in the longitudinal direction of the workpiece W1 in the example. The movement of the second holder 11 by the holder moving mechanism 17 is controlled by the controller 18.

In the example illustrated in FIGS. 1A to 1F, only the first electrode 12 out of the first electrode 12 and the second electrode 13 is moved in the longitudinal direction of the workpiece W1 and the workpiece W1 is heated by direct resistance heating.

Figure 1B:
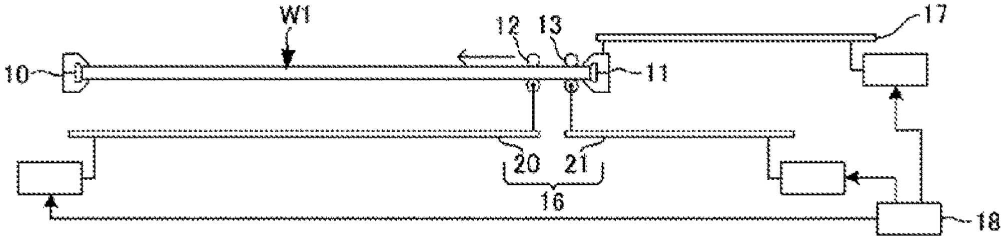
FIG. 1B is a diagram illustrating the direct resistance heating apparatus and the direct resistance heating method together with FIG. 1A.

First, as illustrated in FIGS. 1A and 1B, the first electrode 12 and the second electrode 13 are arranged on the end portion R of the workpiece W1 in a state of being in contact with the workpiece W1.

Figure 1C:
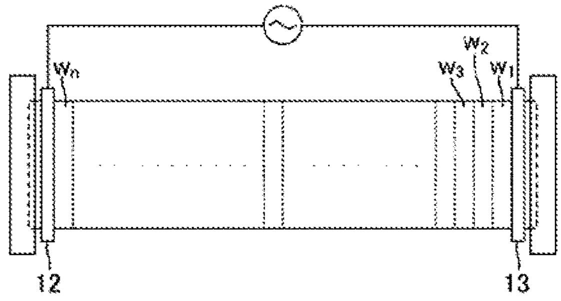
FIG. 1C is a diagram illustrating the direct resistance heating apparatus and the direct resistance heating method together with FIGS. 1A and 1B.
Figure 1D:
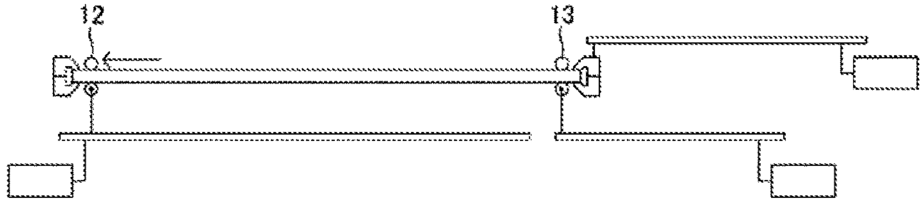
FIG. 1D is a diagram illustrating the direct resistance heating apparatus and the direct resistance heating method together with FIGS. 1A to 1C.

As illustrated in FIGS. 1C and 1D, in a state in which current is applied from the power supply 15 to the workpiece W1 through the first electrode 12 and the second electrode 13, the first electrode 12 is moved toward the end portion L of the workpiece W1 and a gap between the first electrode 12 and the second electrode 13 is gradually increased. In the workpiece W1, current is applied to a region between the first electrode 12 and the second electrode 13 and the region is heated by direct resistance heating. The first electrode 12 reaches the end portion L and then the current application to the workpiece W1 is terminated.

During a period from the start of the current application to the workpiece W1 to the termination of the current application, at least one of the moving speed of the first electrode 12 and the amount of current passing through the workpiece W1 are controlled by the controller 18. Accordingly, when the heating target region of the workpiece W1 is divided into a plurality of strip-shaped segment regions ($w_1$, $w_2$, . . . $w_n$) arranged side by side in the longitudinal direction, the amount of heat generated in each segment region can be controlled.

FIG. 1C illustrates the heating target region of the workpiece W1 being divided into n segment regions by a length ΔI. In a case where the amount of current when the first electrode 12 passes through an i-th segment region is Ii (A), and the time when the first electrode 12 passes through the i-th segment region is ti (sec), since the first electrode 12 is heated after the first electrode passes through the i-th segment region, the amount of temperature rise of the i-th segment region is obtained from the following equation:

$$\theta_i = \frac{\rho_e}{C\rho}\frac{1}{A_i^2}\sum_i^n (I_i^2 \times t_i)$$

wherein, ρe represents resistivity (Ω·m), ρ presents density (kg/m$^3$), c represents specific heat (J/kg·° C.), and Ai represents a sectional area (m$^2$) of the i-th divided area.

Figure 1E:
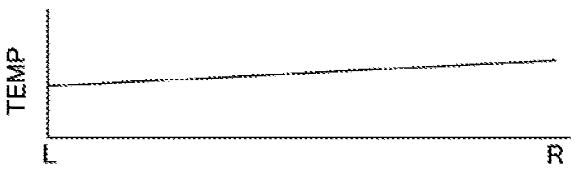
FIG. 1F is diagram illustrating the direct resistance heating apparatus and the direct resistance heating method together with FIGS. 1A to 1D.

In the workpiece W1 in which the thickness and width are constant along the longitudinal direction, that is, the sectional area is constant along the longitudinal direction, basically, as illustrated in FIG. 1E, a temperature distribution in which the amount of temperature rise is gradually decreased from the end portion R of the workpiece W1 to the end portion L thereof coincident with the moving direction of the moved first electrode 12 is obtained. By controlling at least one of the moving speed of the first electrode 12 and the amount of current passing through the workpiece W1, for example, the amount of temperature rise of the workpiece W1 is entirely increased or decreased so that a difference in temperature between both end portions L and R of the workpiece W1 can be increased or decreased.

Figure 1F:
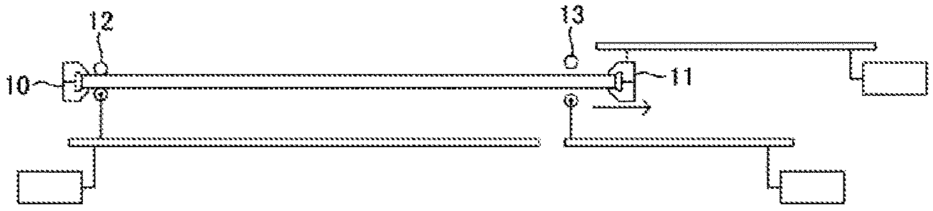

Although thermal expansion occurs in the heated workpiece W1, the second holder 11 is moved in the longitudinal direction of the workpiece W1 and the workpiece W1 is pulled in the longitudinal direction to flatten the workpiece W1. Preferably, as illustrated in FIG. 1F, the current application to the workpiece W1 is terminated and in a state in which the second electrode 13 is separated from the workpiece W1, the second holder 11 is moved in the longitudinal direction of the workpiece W1. Accordingly, the second electrode 13 and the workpiece W1 are prevented from being slid and wear of the second electrode 13 is suppressed.

The workpiece W1 may be flattened by moving the first holder 10 or moving both the first holder 10 and the second holder 11. In a case where the first holder 10 is moved, preferably, in a state in which the first electrode 12 is separated from the workpiece W1, the first holder 10 is moved in the longitudinal direction of the workpiece W1.

FIGS. 2A to 2F illustrate another example of the direct resistance heating method of the workpiece W1.

In the example illustrated in FIGS. 2A to 2F, both the first electrode 12 and the second electrode 13 are moved in the longitudinal direction of the workpiece W1 and the workpiece W1 is heated by direct resistance heating.

Figure 2A:
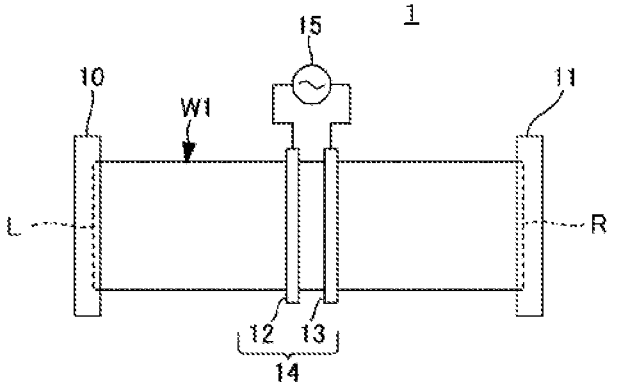
FIG. 2A is a diagram illustrating a direct resistance heating method according to another embodiment of the present invention.
Figure 2B:
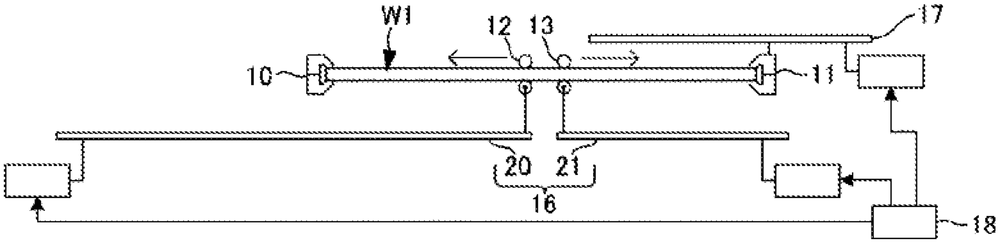
FIG. 2B is a diagram illustrating the direct resistance heating method together with FIG. 2A.

First, as illustrated in FIGS. 2A and 2B, the first electrode 12 and the second electrode 13 are arranged approximately at the center portion of the workpiece W1 in the longitudinal direction in a state of being in contact with the workpiece W1.

Figure 2C:
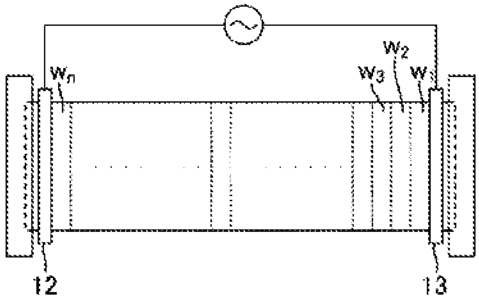
FIG. 2C is a diagram illustrating the direct resistance heating method together with FIGS. 2A and 2B.
Figure 2D:
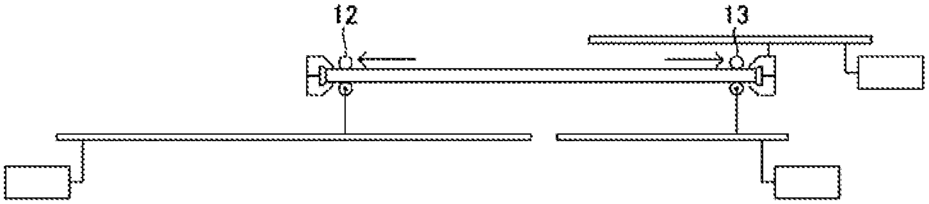
FIG. 2D is a diagram illustrating the direct resistance heating method together with FIGS. 2A to 2C.

As illustrated in FIGS. 2C and 2D, in a state in which current is applied from the power supply 15 to the workpiece W1 through the first electrode 12 and the second electrode 13, the first electrode 12 is moved toward the end portion L of the workpiece W1, the second electrode 13 is moved toward the end portion R of the workpiece W1, and a gap between the first electrode 12 and the second electrode 13 is gradually increased. In the workpiece W1, current is applied to a region between the first electrode 12 and the second electrode 13 and the region is heated by direct resistance heating. After the first electrode 12 reaches the end portion L and the second electrode 13 reaches the end portion R, the current application to the workpiece W1 is terminated. The moving speed of the first electrode 12 and the moving speed of the second electrode 13 may be the same as or different from each other.

Figure 2E:
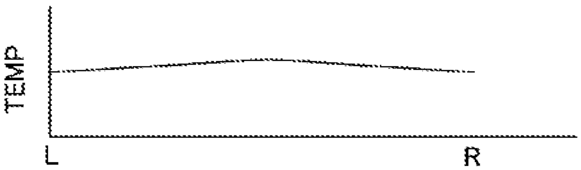
FIG. 2E is a diagram illustrating the direct resistance heating method together with FIGS. 2A to 2D.

In the example, basically, as illustrated in FIG. 2E, a temperature distribution in which the amount of temperature rise is gradually decreased from the center portion of the workpiece W1 to respective both end portions L and R is obtained. During a period from the start of the current application to the workpiece W1 to the termination of the current application, by controlling at least one of the moving speeds of the first electrode 12 and the second electrode 13 and the amount of current passing through the workpiece W1, for example, the amount of temperature rise of the workpiece W1 is entirely increased or decreased so that differences in temperature between the center portion and each of both end portions L and R of the workpiece W1 can be increased or decreased.

Figure 2F:
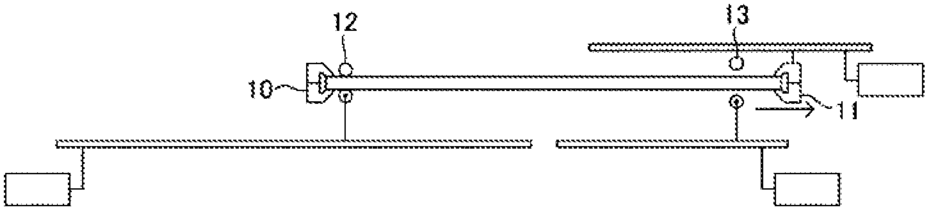
FIG. 2F is a diagram illustrating the direct resistance heating method together with FIGS. 2A to 2E.

As illustrated in FIG. 2F, the current application to the workpiece W1 is terminated and in a state in which the second electrode 13 is separated from the workpiece W1, the second holder 11 is moved in the longitudinal direction of the workpiece W1 and the workpiece W1 is pulled in the longitudinal direction to make the workpiece W1 flat.

In this manner, in a state in which the current is applied from the power supply 15 to the workpiece W1 through the first electrode 12 and the second electrode 13, at least one of the first electrode 12 and the second electrode 13 is moved in the longitudinal direction of the workpiece W1 and at least one of the moving speed of the moved electrode and the amount of current passing through the workpiece W1 are controlled, so that the heating target region of the workpiece W1 divided into a plurality of strip-shaped segment regions ($w_1$, $w_2$, . . . $w_n$) arranged side by side in the longitudinal direction can be heated to have a predetermined temperature distribution only with a pair of electrodes 14 by controlling the amount of heat generated in each segment region. Accordingly, there is no need to arrange a plurality of pairs of electrodes in the workpiece W1 in the width direction to oppose each other and to control the amount of current for each of the pairs of electrodes in accordance with a temperature distribution as in the related art, and the configuration of the direct resistance heating apparatus 1 can be simplified.

By holding the workpiece W1 by the first holder 10 and the second holder 11 which are arranged to hold the heating target region of the workpiece W1 therebetween, even in a case where both the first electrode 12 and the second electrode 13 are moved between the first holder 10 and the second holder 11 as illustrated in FIGS. 2A to 2F, the amount of heat generated in each segment region can be accurately controlled. In a case where the first electrode 12 out of the first electrode 12 and the second electrode 13 is moved as illustrated in FIGS. 1A to 1F, the fixed second electrode 13 is used as a holder and the second holder 11 can be omitted. However, in a case where the second holder 11 is omitted in the example illustrated in FIGS. 2A to 2F, the workpiece W1 may be displaced in the longitudinal direction with respect to the second electrode 13 due to thermal expansion of the workpiece W1 involved in direct resistance heating. In contrast, by holding the workpiece W1 by the first holder 10 and the second holder 11 which are arranged to hold the heating target region of the workpiece W1 therebetween, the displacement of the workpiece W1 caused by thermal expansion of the workpiece W1 in the longitudinal direction with respect to the second electrode 13 can be controlled and the amount of heat generated in each segment region arranged side by side in the longitudinal direction can be accurately controlled.

Preferably, each of the first electrode 12 and the second electrode 13 has a size that extends across the heating target region of the workpiece W1 in the width direction of the workpiece W1, for example, in a direction intersecting the moving direction of the electrode. Accordingly, the temperature distribution in the width direction of the workpiece W1 is suppressed.

The direct resistance heating apparatus 1 can also be applied to a workpiece having a varying sectional area in the longitudinal direction due to a variation in the width and thickness of the heating target region in the longitudinal direction and a workpiece having a varying sectional area in the longitudinal direction due to an opening or a cut-out region present in the heating target region.

Figure 3A:
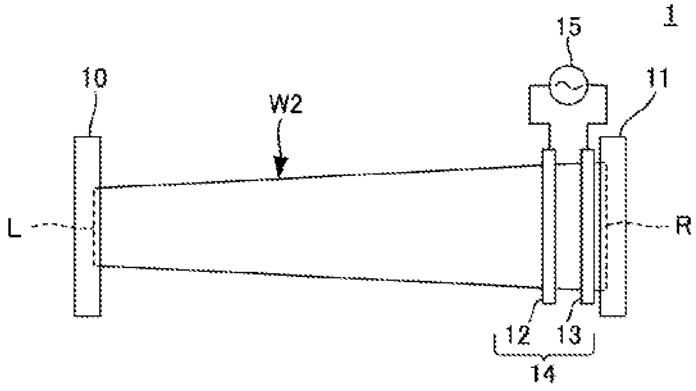
FIG. 3A is a diagram illustrating a direct resistance heating method according to another embodiment of the present invention.
Figure 3B:
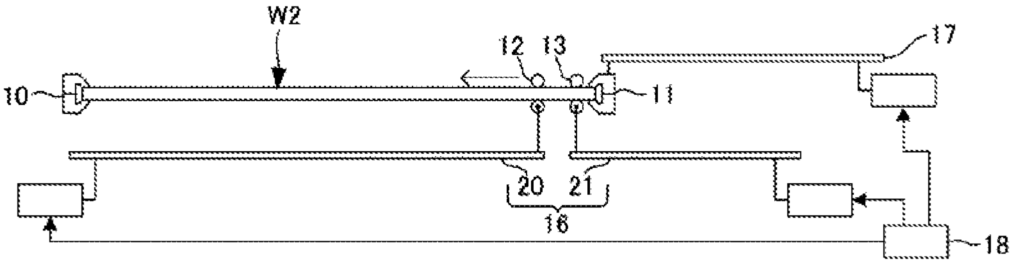
FIG. 3B is a diagram illustrating the direct resistance heating method together with FIG. 3A.
Figure 3C:
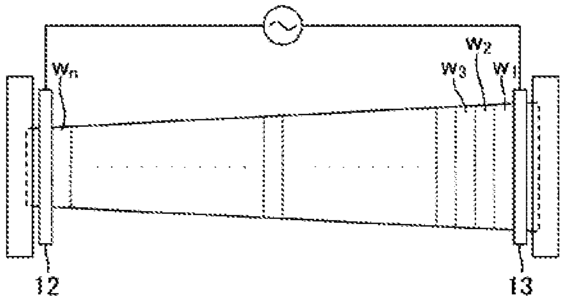
FIG. 3C is a diagram illustrating the direct resistance heating method together with FIGS. 3A and 3B.
Figure 3D:
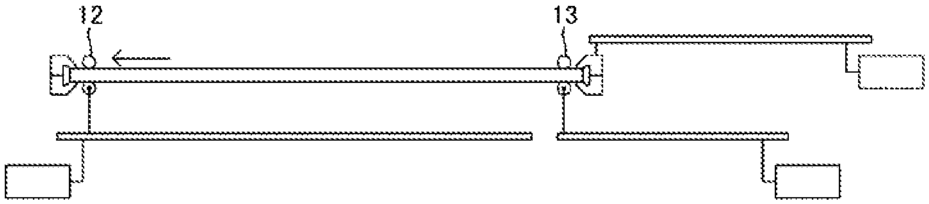
FIG. 3D is a diagram illustrating the direct resistance heating method together with FIGS. 3A to 3C.
Figure 3E:
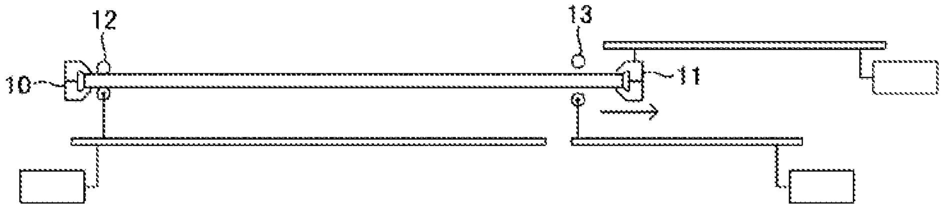
FIG. 3E is a diagram illustrating the direct resistance heating method together with FIGS. 3A to 3D.

A workpiece W2 in the example illustrated in FIGS. 3A and 3E is a plate workpiece formed of a single member and is formed into a trapezoidal shape in which the thickness is constant and the width is gradually decreased from one end portion R to the other end portion L in the longitudinal direction, and the entire region thereof is one heating target region. In the workpiece W2, the sectional area monotonically decreases from the end portion R in which the sectional area of the cross-section vertical to the longitudinal direction is relatively wide to the end portion L in which the sectional area thereof is relatively narrow and in other words, the resistance per unit length in the longitudinal direction monotonically increases from the end portion R to the end portion L.

The sectional area in the width direction monotonically increases or decreases along the longitudinal direction means that a variation in the sectional area along the longitudinal direction, that is, a sectional area at respective points along the longitudinal direction increases or decreases along one direction without an inflection point. The sectional area can be considered as monotonically increasing or monotonically decreasing, if a partially low-temperature portion or a partially high-temperature portion, which may be practically problematic, is not generated at the time of direct resistance heating due to current density being excessively non-uniform in the width direction as a result of a sharp variation in the sectional area in the longitudinal direction.

In the example illustrated in FIGS. 3A to 3E, only the first electrode 12 out of the first electrode 12 and the second electrode 13 is moved in the longitudinal direction of the workpiece W2 and the workpiece W2 is heated by direct resistance heating.

First, as illustrated in FIGS. 3A and 3B, the first electrode 12 and the second electrode 13 are arranged on the end portion R of the workpiece W2 in which the sectional area is relatively wide in a state of being in contact with the workpiece W2.

As illustrated in FIGS. 3C and 3D, in a state in which the current is applied from the power supply 15 to the workpiece W2 through the first electrode 12 and the second electrode 13, the first electrode 12 is moved toward the end portion L of the workpiece W2 and a gap between the first electrode 12 and the second electrode 13 is gradually increased. In the workpiece W2, current flows in a region between the first electrode 12 and the second electrode 13 and the region is heated by direct resistance heating. The first electrode 12 reaches the end portion L and then the current application to the workpiece W2 is terminated.

As illustrated in FIG. 3E, the current application to the workpiece W2 is terminated and in a state in which the second electrode 13 is separated from the workpiece W2, the second holder 11 is moved in the longitudinal direction of the workpiece W2 and the workpiece W2 is pulled in the longitudinal direction to make the workpiece W2 flat.

During a period from the start of the current application to the workpiece W2 to the termination of the current application, at least one of the moving speed of the first electrode 12 and the amount of current passing through the workpiece W2 are controlled by the controller 18. Accordingly, when the heating target region of the workpiece W2 is divided into a plurality of strip-shaped segment regions ($w_1$, $w_2$, . . . $w_n$) arranged side by side in the longitudinal direction, the amount of heat generated in each segment region can be controlled. Particularly, by moving the first electrode 12 in the longitudinal direction of the workpiece W2, it is possible to heat the workpiece W2 to be within a predetermined temperature range considered as a uniform temperature in the workpiece W2 in which the sectional area monotonically decreases along the moving direction of the first electrode 12.

Figure 4:
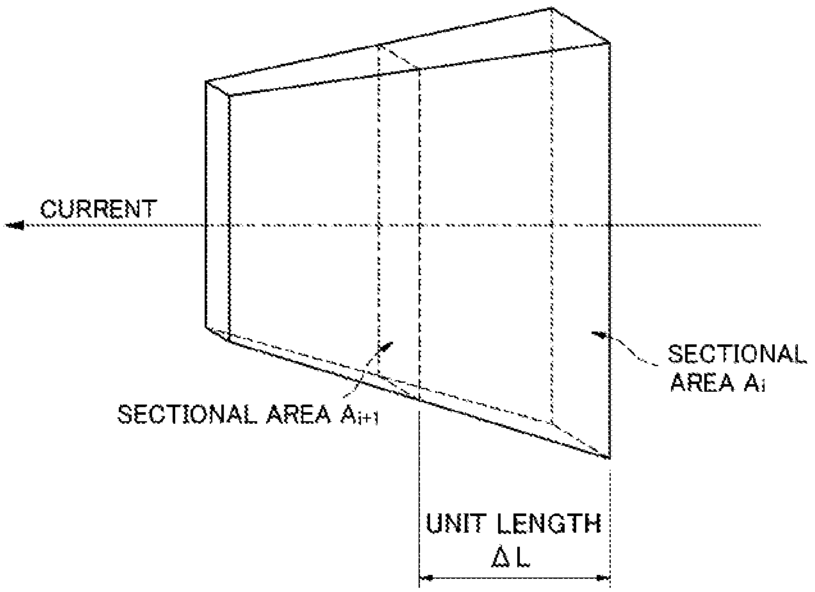
FIG. 4 is a diagram illustrating an adjustment of a moving speed of an electrode and amount of current in a case of heating a workpiece in a predetermined temperature range in the direct resistance heating method of FIGS. 3A to 3E.

FIG. 4 illustrates a control of the moving speed of the first electrode 12 and a control of the amount of current passing through the workpiece W2 when heating the workpiece W2 in a predetermined temperature range.

In a case where the heating target region of the workpiece W2 is divided into n segment regions by a unit length ΔI, the amount of temperature rise of an i-th segment region is obtained from the foregoing equation, and to make the amount of temperature rise of each of the segment regions constant such as θ1=θ2= . . . =θn, the amount of current Ii and the time ti (electrode moving speed Vi) may be controlled so as to satisfy the following equation.

$$\frac{1}{A_1^2}\sum_{i=1}^{n}(I_i^2\times t_i)=\frac{1}{A_2^2}\sum_{i=2}^{n}(I_i^2\times t_i)=\ldots=\frac{1}{A_n^2}\sum_{i=n}^{n}(I_i^2\times t_i)$$

In a case where the second electrode 13 is fixed to the end portion R of the workpiece W2 and the first electrode 12 is moved from the end portion R to the end portion L of the workpiece W2, the current application time of each segment region is different and the segment region closer to the end portion R side has longer current application time. In a case where an equal current is applied to the segment region on the end portion R side and the segment region on the end portion L side for the same period of time, the resistance per unit length is relatively small and the amount of heat generated in the segment regions decreases toward the end portion R.

When the amount of heat generated in each segment region is adjusted by controlling at least one of the moving speed of the first electrode 12 and the amount of current passing through the workpiece W2 based on a variation in the resistance per unit length, the workpiece W2 can be uniformly heated.

Figure 5:
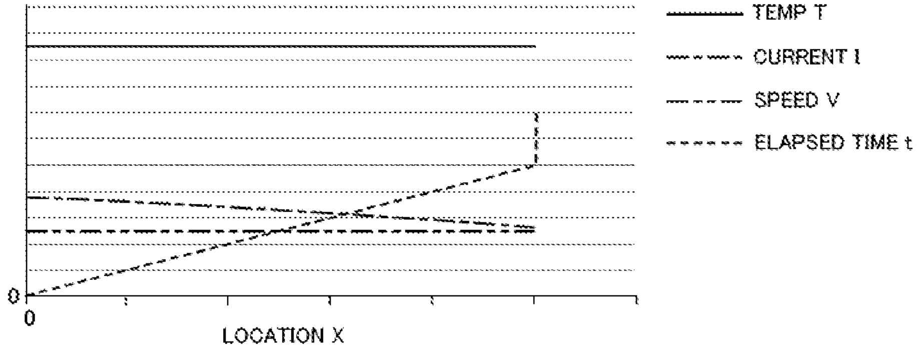
FIG. 5 is a diagram illustrating an example of a relationship between an elapsed time from heating start and a location of an electrode, a relationship between movement of the electrode and an amount of current, and a temperature distribution of a workpiece at the time of heating end in the heating method of FIGS. 3A to 3E.
Figure 6:
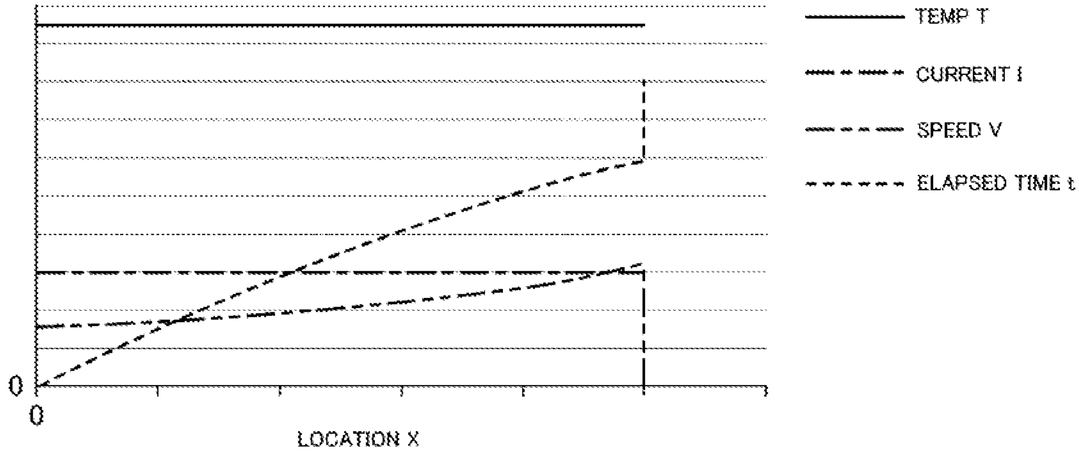
FIG. 6 is a diagram illustrating another example of a relationship between an elapsed time from heating start and a location of an electrode, a relationship between movement of the electrode and an amount of current, and a temperature distribution of the workpiece at the time of heating end in the heating method of FIGS. 3A to 3E.

FIGS. 5 and 6 respectively illustrate examples of a relationship between an elapsed time from start of current application and a location of the first electrode 12, a relationship between movement of the first electrode 12 and an amount of current passing through the workpiece W2, and a temperature distribution of the workpiece W2 at the time of the termination of current application in the longitudinal direction. In FIGS. 5 and 6, the initial location of the first electrode 12 (the end portion R of the workpiece W2) at the time of the start of the current application is set as the origin, and the location of the first electrode 12 is indicated by a distance from the origin.

In the example illustrated in FIG. 5, the first electrode 12 is moved from the end portion R of the workpiece W2 to the end portion L at a constant speed, and the current passing through the workpiece W2 is adjusted to be gradually decreased. The first electrode 12 is held at the end portion L for a predetermined period of time after the first electrode 12 reaches the end portion L, and during the period of time, the current at the time when the first electrode 12 reaches the end portion L flows through the workpiece W2. By the current adjustment, the workpiece W2 can be uniformly heated by direct resistance heating.

In the example illustrated in FIG. 6, a constant current flows through the workpiece W2, the first electrode 12 is moved from the end portion R to the end portion L of the workpiece W2 and the moving speed is adjusted to be gradually decreased. For a predetermined period of time after the first electrode 12 reaches the end portion L, the first electrode 12 is held at the end portion L and during the period of time, a constant current flows through the workpiece W2. By the current adjustment, the workpiece W2 can be uniformly heated by direct resistance heating.

Figure 7A:
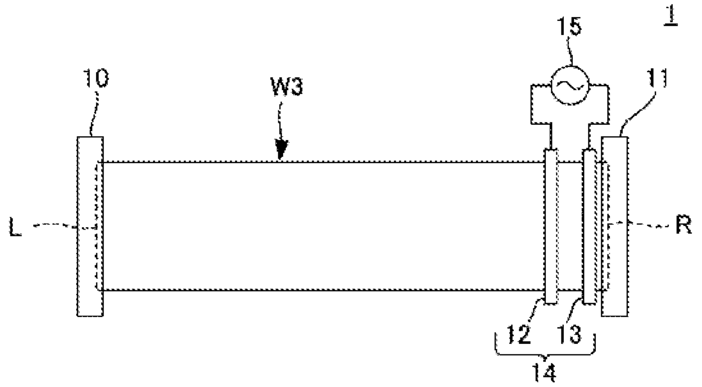
FIG. 7A is a diagram illustrating a direct resistance heating method according to another embodiment of the present invention.
Figure 7B:
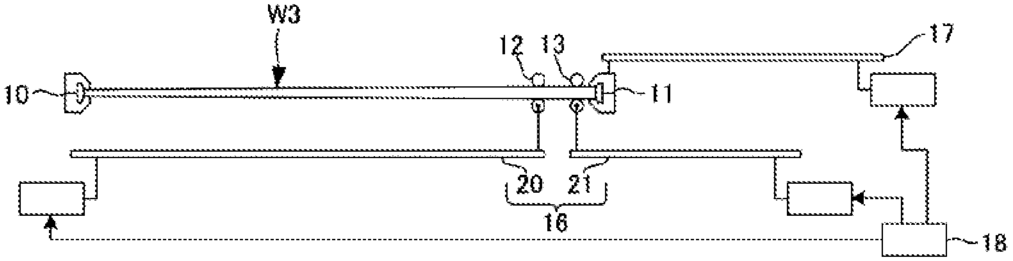
FIG. 7B is a diagram illustrating the direct resistance heating method together with FIG. 7A.
Figure 7C:
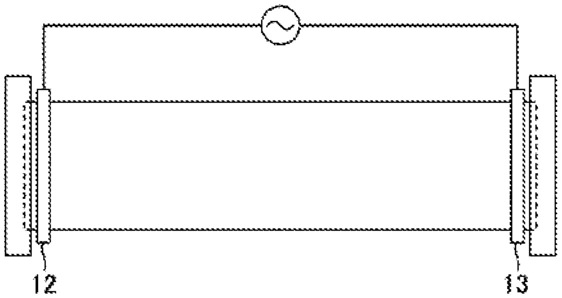
FIG. 7C is a diagram illustrating the direct resistance heating method together with FIGS. 7A and 7B.
Figure 7D:
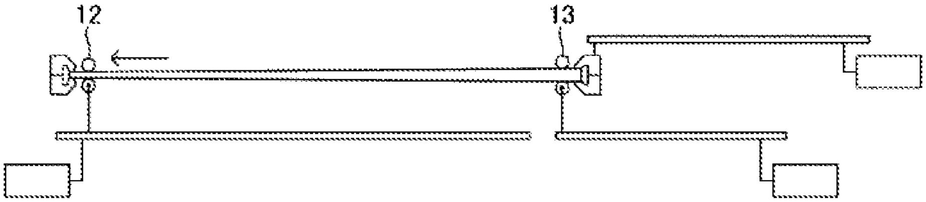
FIG. 7D is a diagram illustrating the direct resistance heating method together with FIGS. 7A to 7C.
Figure 7E:
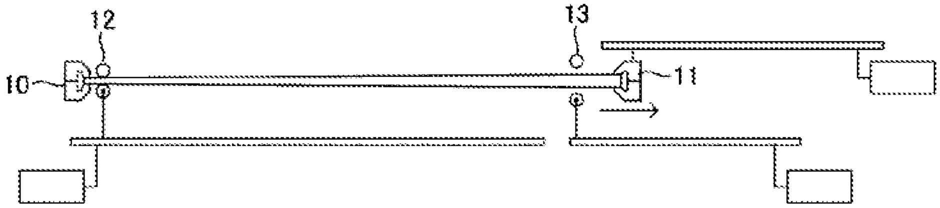
FIG. 7E is a diagram illustrating the direct resistance heating method together with FIGS. 7A to 7D.
Figure 8A:
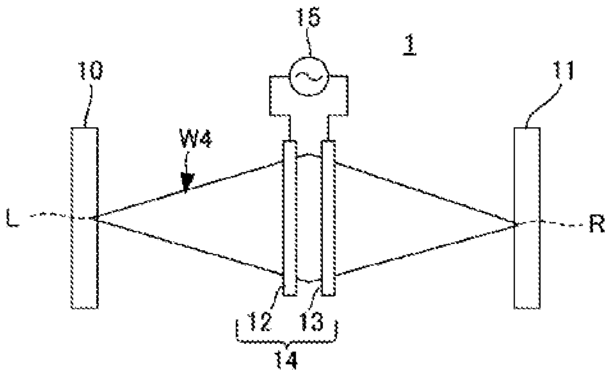
FIG. 8A is a diagram illustrating a direct resistance heating method according to another embodiment of the present invention.
Figure 8B:
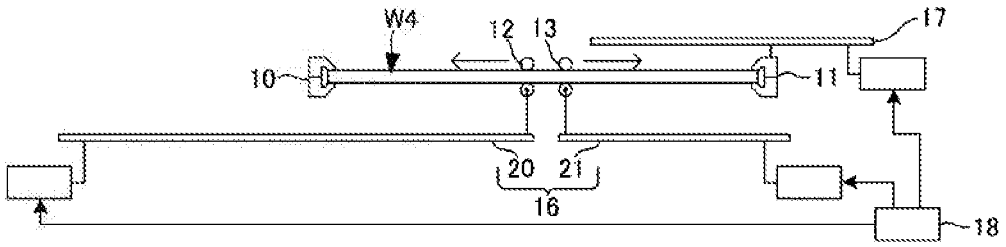
FIG. 8B is a diagram illustrating the direct resistance heating method together with FIG. 8A.
Figure 8C:
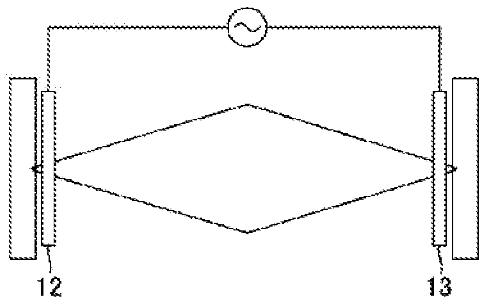
FIG. 8C is a diagram illustrating the direct resistance heating method together with FIGS. 8A and 8B.
Figure 8D:
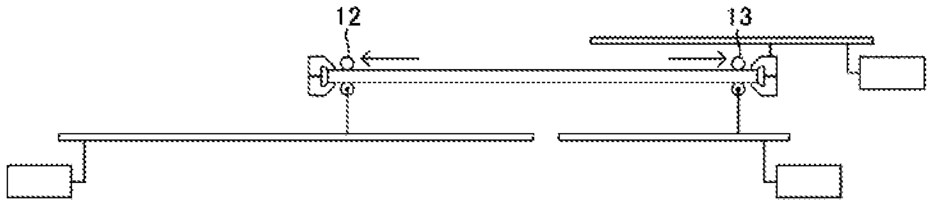
FIG. 8D is a diagram illustrating the direct resistance heating method together with FIGS. 8A to 8C.
Figure 8E:
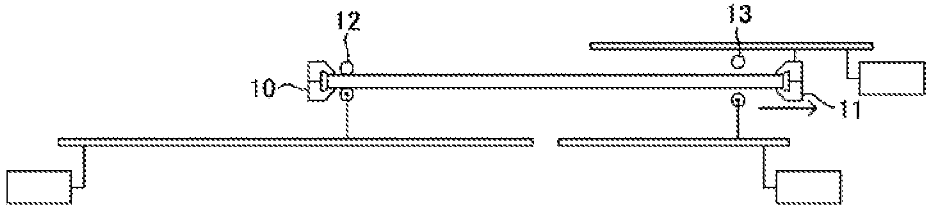
FIG. 8E is a diagram illustrating the direct resistance heating method together with FIGS. 8A to 8D.
Figure 9A:
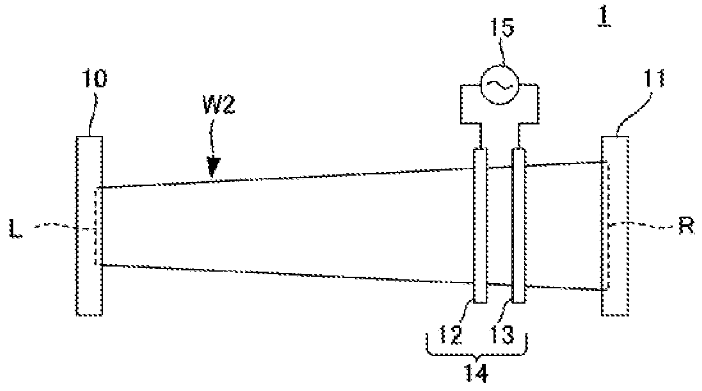
FIG. 9A is a diagram illustrating a direct resistance heating method according to another embodiment of the present invention.
Figure 9B:
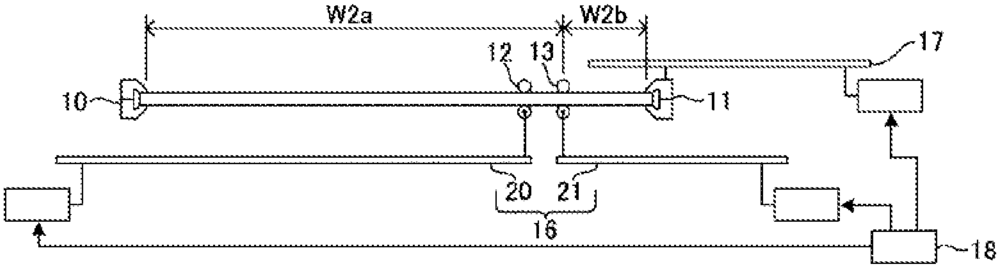
FIG. 9B is a diagram illustrating the direct resistance heating method together with FIG. 9A.
Figure 9C:
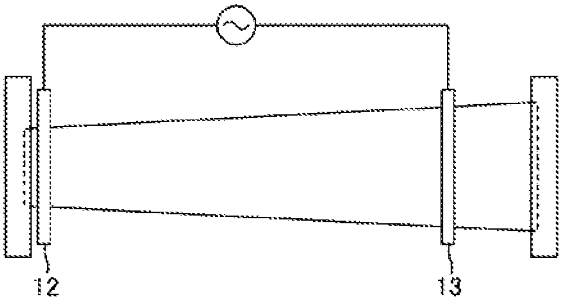
FIG. 9C is a diagram illustrating the direct resistance heating method together with FIGS. 9A and 9B.
Figure 9D:
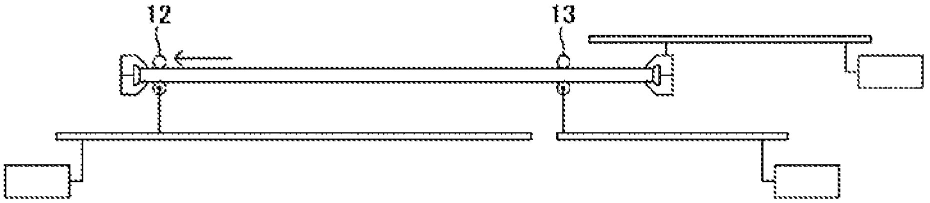
FIG. 9D is a diagram illustrating the direct resistance heating method together with FIGS. 9A to 9C.
Figure 9E:
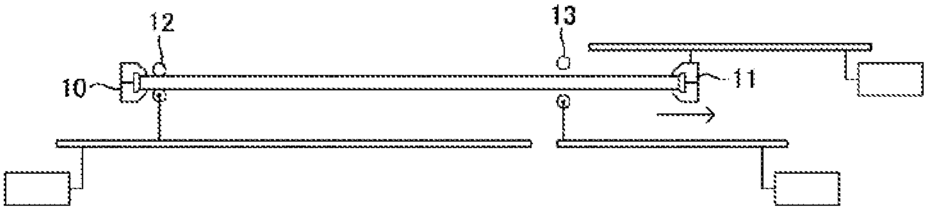
FIG. 9E is a diagram illustrating the direct resistance heating method together with FIGS. 9A to 9D.

A workpiece W3 in the example illustrated in FIGS. 7A and 7E is a plate workpiece formed of a single member and is formed such that the width is constant and the thickness monotonically decreases from one end portion R to the other end portion L in the longitudinal direction. Similar to the workpiece W2, the sectional area is gradually decreased from the end portion R having a relatively large sectional area to the end portion L having a relatively small sectional area, and in other words, the resistance per unit length in the longitudinal direction monotonically increases from the end portion R to the end portion L.

Accordingly, when the amount of heat generated in each segment region is adjusted by fixing the second electrode 13 to the end portion R of the workpiece W3, moving the first electrode 12 from the end portion R to the end portion L of the workpiece W3, and controlling at least one of the moving speed of the first electrode 12 and the amount of current passing through the workpiece W3 based on a variation in the resistance per unit length of the workpiece W3, the workpiece W3 can be uniformly heated.

A workpiece W4 in the example illustrated in FIGS. 8A to 8E is a plate workpiece formed of a single member, is formed such that the thickness is constant and the width gradually decreases from the center portion in the longitudinal direction to both end portions L and R, and is formed into a substantially diamond shape symmetric to the center portion as a boundary. The sectional area of a portion ranging from the center portion of the workpiece W4 in the longitudinal direction to the end portion L monotonically decreases from the center portion having a relatively wide sectional area to the end portion L having a relatively narrow sectional area and in other words, the resistance per unit length in the longitudinal direction monotonically increases from the center portion to the end portion L. The sectional area of the portion ranging from the center portion of the workpiece W4 in the longitudinal direction to the end portion L monotonically decreases from the center portion having a relatively wide sectional area to the end portion R having a relatively narrow sectional area and in other words, the resistance per unit length in the longitudinal direction monotonically increases from the center portion to the end portion R.

Accordingly, when the amount of heat generated in each segment region is adjusted by arranging the first electrode 12 and the second electrode 13 at the center portion of the workpiece W4 in the longitudinal direction, moving the first electrode 12 to the end portion L of the workpiece W4 and also moving the second electrode 13 to the end portion R of the workpiece W4 in combination, controlling at least one of the moving speed of each of the first electrode 12 and the second electrode 13 and the amount of current passing through the workpiece W4 based on a variation in the resistance per unit length of the workpiece W4, the workpiece W4 can be uniformly heated.

In this manner, at least one of the moving speed of each of the first electrode 12 and the second electrode 13 and the amount of current passing through the workpiece are controlled based on variations in the resistance of each segment region obtained from the shape and size of the heating target region of the workpiece, so that the heating target region of the workpiece can be heated to be within a predetermined temperature range considered as a substantially uniform temperature.

A part of the workpiece can be formed into a heating target region. In the example illustrated in FIGS. 9A to 9E, a relatively narrow partial region on the end portion L side is set to a heating target region W2*a* and a relatively wide partial region on the end portion R side is set to a non-heating region W2*b* in the above-described workpiece W2. Such a workpiece is used for, for example, an impact absorbing member and the hardness of the heating target region W2*a* is increased by heating, while the non-heating region W2*b* is kept soft to be easily deformed by impact or the like.

The sectional area of the heating target region W2*a* monotonically decreases from the boundary with the non-heating region W2*b* to the end portion L, and in other words, the resistance per unit length in the longitudinal direction monotonically increases from the boundary with the non-heating region W2*b* to the end portion L.

Accordingly, when the amount of heat generated in each segment region is adjusted by providing the first electrode 12 and the second electrode 13 in the heating target region W2*a* to be adjacent to the boundary between the heating target region W2*a* and the non-heating region W2*b*, fixing the second electrode 13 and moving the first electrode 12 to the end portion L, and controlling at least one of the moving speed of the first electrode 12 and the mount of current passing through the workpiece W2 based on a variation in the resistance per unit length of the heating target region W2*a*, the heating target region W2*a* can be uniformly heated.

Figure 10:
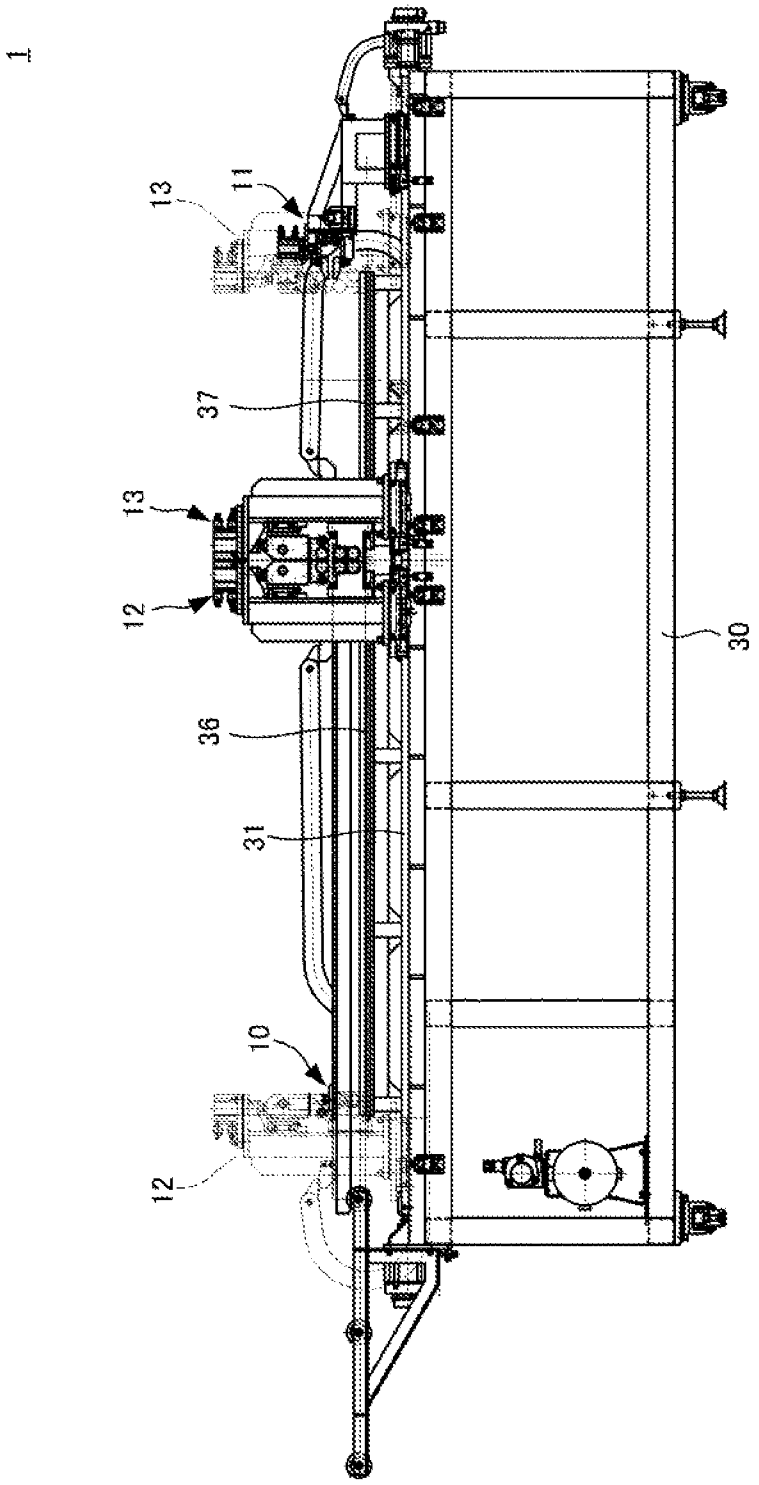
FIG. 10 is a side view of the direct resistance heating apparatus of FIGS. 1A to 1F.
Figure 11:
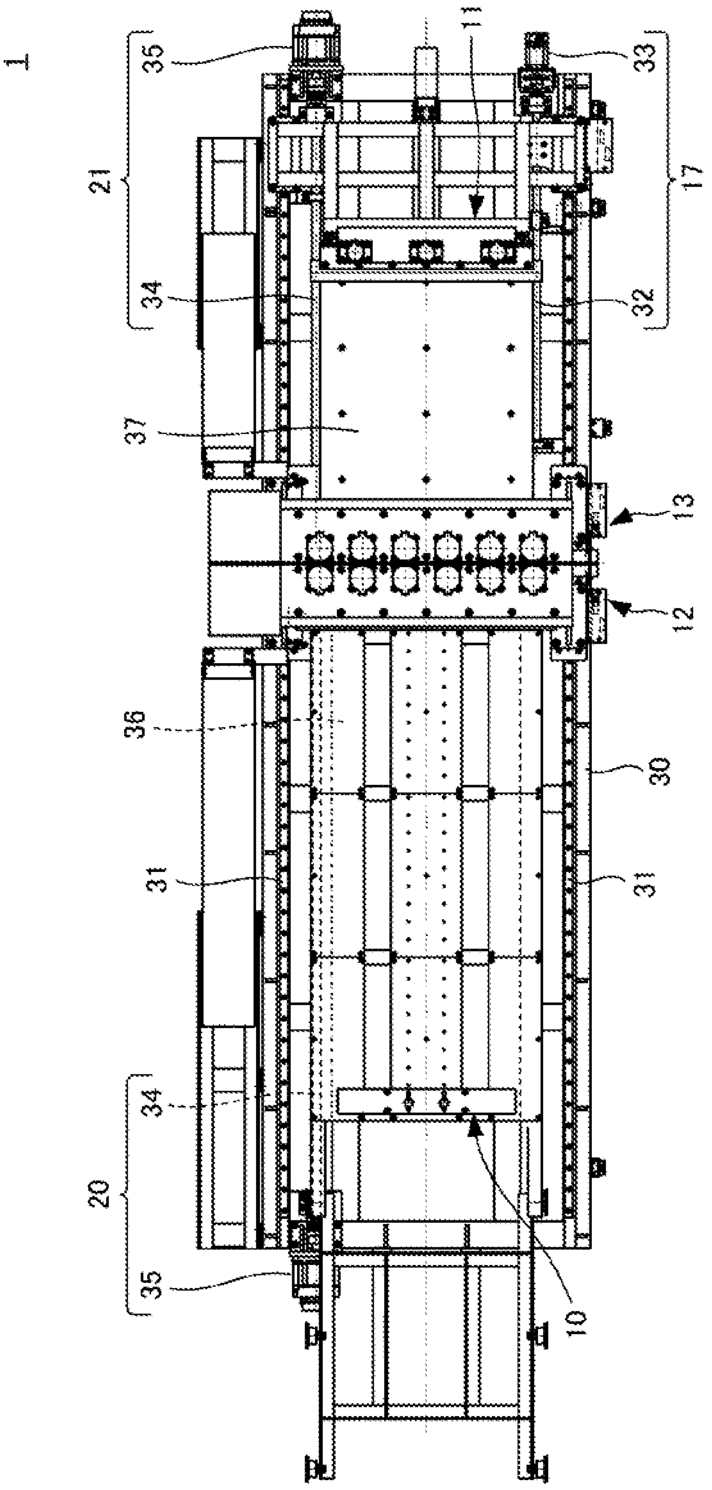
FIG. 11 is a plan view of the direct resistance heating apparatus of FIGS. 1A to 1F.

FIGS. 10 and 11 illustrate the detailed configuration of the direct resistance heating apparatus 1.

The direct resistance heating apparatus 1 includes a slide rail 31 arranged on a mounting base 30. The slide rail 31 extends in one direction and the first holder 10, the second holder 11, the first electrode 12, and the second electrode 13 are arranged on the slide rail 31 and supported on the slide rail 31 to be movable along the slide rail 31.

The holder moving mechanism 17 for moving the second holder 11 is configured to include a thread shaft 32 which extends parallel to the slide rail 31, and a motor 33 which rotationally drives the thread shaft 32. The second holder 11 is screwed to the thread shaft 32 and the second holder 11 is moved along the thread shaft 32 according to rotation of the thread shaft 32. The rotation of the motor 33 is controlled by the controller 18 (refer to FIGS. 1A to 1F) and based on the control of the motor 33 by the controller 18, the second holder 11 is moved by the holder moving mechanism 17 in a movement range from the center portion of the slide rail 31 in the longitudinal direction to one end portion of the slide rail 31.

The first holder 10 can be moved in a movement range from the center portion of the slide rail 31 in the longitudinal direction to the other end portion of the slide rail 31 and is fixed at an appropriate location corresponding to the length of a workpiece in this movement range. The first holder 10 may also be moved by the holder moving mechanism 17 and in this case, the thread shaft and the motor corresponding to the first holder 10 are provided in the holder moving mechanism 17.

The first electrode 12 and the second electrode 13 are arranged between the first holder 10 and the second holder 11 on the slide rail 31.

The first moving unit 20 which moves the first electrode 12 is configured to include a thread shaft 34 which extends parallel to the slide rail 31 and a motor 35 which rotationally drives the thread shaft 34. The first electrode 12 is screwed to the thread shaft 34 and the first electrode 12 is moved along the thread shaft 34 according to rotation of the thread shaft 34. The rotation of the motor 35 is controlled by the controller 18 and based on the control of the motor 35 by the controller 18, the first electrode 12 is moved by the first moving unit 20 in a movement range from the center portion of the slide rail 31 in the longitudinal direction to the first holder 10.

The second moving unit 21 which moves the second electrode 13 is configured to include the thread shaft 34 and the motor 35 similar to the first moving unit 20, and based on the control of the motor 35 by the controller 18, the second electrode 13 is moved by the second moving unit 21 in a movement range from the center portion of the slide rail 31 in the longitudinal direction to the second holder 11.

The holder moving mechanism 17, the first moving unit 20, and the second moving unit 21 may be configured by another linear motion mechanism such as a fluid pressure cylinder.

The direct resistance heating apparatus 1 further includes a first bus bar 36 arranged on the mounting base 30 along the workpiece held by the first holder 10 and the second holder 11, and a second bus bar 37. The first bus bar 36 extends over a substantially entire length of the movement range of the first holder 10 including in the movement range of the first electrode 12 and the second bus bar 37 extends over the substantially entire length of the movement range of the second holder 11 including in the movement range of the second electrode 13.

The first bus bar 36 and the second bus bar 37 are formed of a highly conductive material, such as copper, and for example, a hard plate material having a sectional area sufficient for supplying the current required at the time of direct resistance heating of the workpiece may be used. The first bus bar 36 and the second bus bar 37 are insulated from each other, the first bus bar 36 is electrically connected to one electrode of the power supply 15 (refer to FIGS. 1A to 1F), and the second bus bar 37 is electrically connected to the other electrode of the power supply 15.

Figure 12:
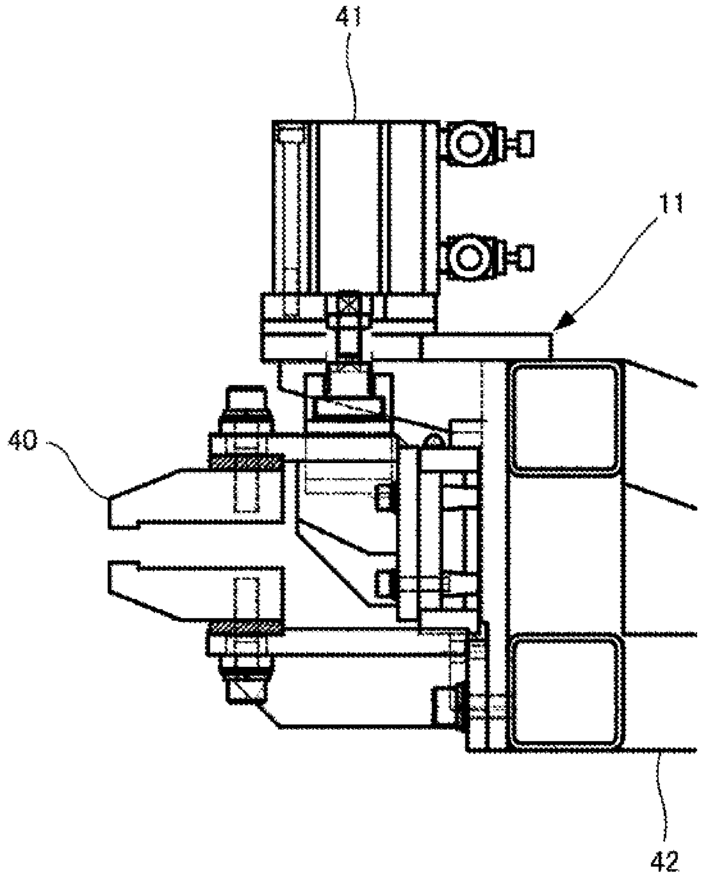
FIG. 12 is a side view of a holder of the direct resistance heating apparatus of FIGS. 1A to 1F.

FIG. 12 illustrates the configuration of the second holder 11.

The second holder 11 moved by the holder moving mechanism 17 has a chuck 40 which holds a workpiece, a driving unit 41 which drives the chuck 40 to be opened or closed, and a movement frame 42 which supports the chuck 40 and the driving unit 41.

The movement frame 42 is supported on the slide rail 31 to be movable, is screwed to the thread shaft 32 (refer to FIG. 11) of the holder moving mechanism 17, and is moved along the thread shaft 32 according to rotation of the thread shaft 32. The chuck 40 and the driving unit 41 are moved integrally with the movement frame 42. The driving unit 41 is configured by, for example, a fluid pressure cylinder and the operation of the driving unit 41, that is, the opening or closing of the chuck 40 is controlled by the controller 18.

In the example, as the first holder 10, a clamp which is manually opened or closed is used. However, the first holder may have a chuck, a driving unit which drives the chuck to be opened or closed, and a movement frame which is supported on the slide rail 31 to be movable similar to the second holder 11.

Figure 13:
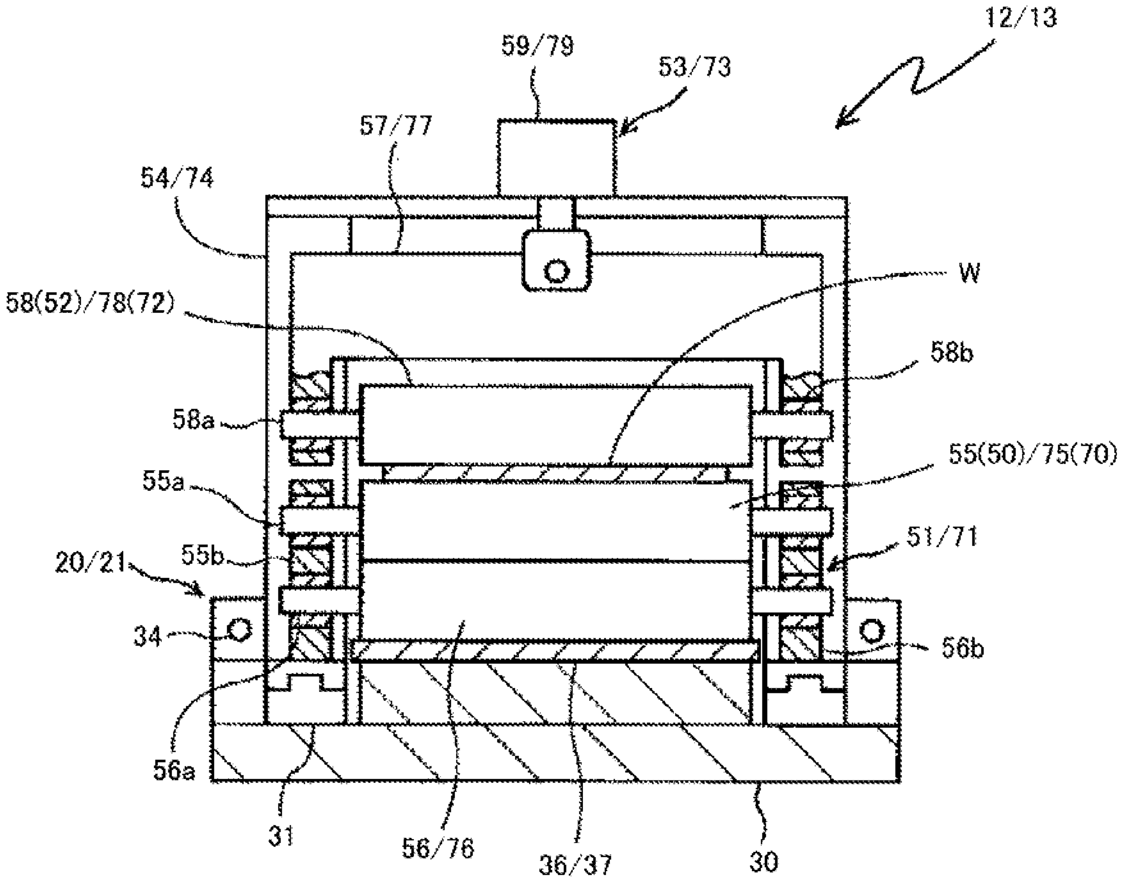
FIG. 13 is a front view of an example of an electrode of the direct resistance heating apparatus of FIGS. 1A to 1F.
Figure 14:
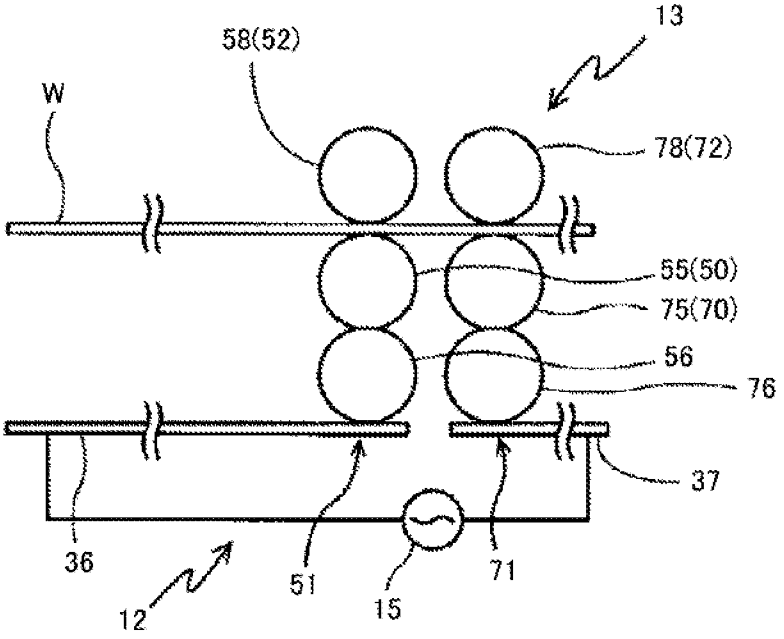
FIG. 14 is a diagram schematically illustrating the electrode of FIG. 13.

FIGS. 13 and 14 illustrate the configuration of examples of the first electrode 12 and the second electrode 13.

The first electrode 12 includes a movable electrode 50 arranged to come into contact a heating target region of a workpiece W, a power feeding mechanism 51 for feeding power from the first bus bar 36 to the movable electrode 50, a pressing member 52 arranged to oppose to the movable electrode 50, a press mechanism 53 for driving the pressing member 52, and a movement frame 54 on which these parts are integrally supported. The movement frame 54 is supported on the slide rail 31 to be movable and is screwed to the thread shaft 34 of the first moving unit 20. Here, in a state in which the movable electrode 50 and the power feeding mechanism 51 are arranged between the first bus bar 36 and the workpiece W, the movable electrode and the power feeding mechanism can be moved integrally with the movement frame 54 by the first moving unit 20.

The movable electrode 50 is formed by current-applying roller 55 which rolls in contact with a surface of the workpiece W. The entire peripheral surface of the current-applying roller 55 is formed of a conductive material and is rotatably supported on a bearing portion 55*b* which is fixed to the movement frame 54 in a state in which a shaft portion 55*a* of the current-applying roller is insulated from a peripheral surface thereof. The peripheral surface of the current-applying roller 55 is formed of a highly conductive material such as copper, cast iron, and carbon and is formed to have a smooth surface having a circular section. The peripheral surface of the current-applying roller 55 is electrically connected to the first bus bar 36 through the power feeding mechanism 51 and comes in contact with the heating target region of the workpiece W in a direction perpendicular to a moving direction of the current-applying roller. The line of contact between the peripheral surface of the current-applying roller 55 and the heating target region of the workpiece W extends across the entire width of the heating target region.

The power feeding mechanism 51 includes a power feeding roller 56 which rolls in contact with the surface of the first bus bar 36. The entire peripheral surface of the power feeding roller 56 is made of a conductive material. The power feeding roller 56 is rotatably supported on a bearing portion 56*b* which is fixed to the movement frame 54 in a state in which a shaft portion 56*a* of the power feeding roller is insulated from a peripheral surface thereof. The peripheral surface of the power feeding roller 56 is formed of a highly conductive material such as copper, cast iron, and carbon and is formed to have a smooth surface having a circular section. The peripheral surface of the power feeding roller 56 comes into contact with the surface of the first bus bar 36 on the workpiece W side in a direction perpendicular to the moving direction of the power feeding roller 56, and the line of contact between the peripheral surface of the power feeding roller 56 and the surface of the first bus bar 36 extends substantially across the entire width of the bus bar.

Although other rollers or the like may be interposed between the power feeding roller 56 and the current-applying roller 55, in the embodiment, the current-applying roller 55 comes into direct contact with the power feeding roller 56 over the substantially entire axial length. Here, since the current-applying roller 55 and the power feeding roller 56 are rotated in opposite directions, the current-applying roller and the power feeding roller are always in contact with each other without sliding. During direct resistance heating, large current can be supplied to the current-applying roller 55 from the first bus bar 36 through the peripheral surface of the power feeding roller 56.

The pressing member 52 includes a pressing roller 58 which is arranged at a location facing the current-applying roller 55 through the workpiece W. Although material of the pressing roller 58 is not particularly limited as long as the pressing roller can come into contact the workpiece W to pressurize the workpiece, it is preferable that the pressing roller is formed of a material having a thermal conductivity lower than the current-applying roller 55. For example, the pressing roller may be formed of cast iron, ceramics, and the like. The shaft portion 58*a* is rotatably supported on a bearing portion 58*b* which is supported on the movement frame 54 to be movable. In this embodiment, the bearing portion 58*b* is supported on a movable bracket 57 provided in the press mechanism 53 and thus can be moved in a contact or separation direction with respect to the current-applying roller 55. Further, the pressing roller 58 is supported on the movement frame 54 and thus can be moved together with the current-applying roller 55 and the power feeding roller 56.

The press mechanism 53 includes a pressing cylinder 59 mounted on the movement frame 54, and a movable bracket 57 which is connected to the pressing cylinder 59 to be movable. Here, the movable bracket 57 is pressed against the current-applying roller 55 by being pressed by the pressing cylinder 59 and the pressing roller 58 presses the workpiece W toward the current-applying roller 55. The pressing operation by the pressing cylinder 59 is released and then the pressing roller 58 and the current-applying roller 55 are separated from the workpiece W, that is, the first electrode 12 is separated from the workpiece W.

The second electrode 13 includes a movable electrode 70 arranged to come into contact the heating target region of the workpiece W, a power feeding mechanism 71 for feeding power from the second bus bar 37 to the movable electrode 70, a pressing member 72 arranged to oppose to the movable electrode 70, a press mechanism 73 for driving the pressing member 72, and a movement frame 74 on which these parts are integrally supported. The movement frame 74 is supported on the slide rail 31 to be movable and is screwed to the thread shaft 34 of the second moving unit 21. Here, in a state in which the movable electrode 70 and the power feeding mechanism 71 are arranged between the second bus bar 37 and the workpiece W, the movable electrode and the power feeding mechanism can be moved integrally with the movement frame 74 by the second moving unit 21.

The movable electrode 70 includes current-applying roller 75 which rolls in contact with the surface of the workpiece W similar to the movable electrode 50 of the first electrode 12. The power feeding mechanism 71 includes a power feeding roller 76 which rolls in contact with a surface of the second bus bar 37 similar to the power feeding mechanism 51 of the first electrode 12. The pressing member 72 includes a pressing roller 78 which is arranged at a location facing the current-applying roller 75 through the workpiece W similar to the pressing member 52 of the first electrode 12, the press mechanism 73 includes a pressing cylinder 79 and a movable bracket 77 similar to the press mechanism 53 of the first electrode 12, and the pressing roller 78 presses the workpiece W toward the current-applying roller 75. The pressurization by the pressing cylinder 79 is released and then the pressing roller 78 and the current-applying roller 75 are separated from the workpiece W, that is, the second electrode 13 is separated from the workpiece W.

According to the direct resistance heating apparatus 1, since the first bus bar 36 and the second bus bar 37 are arranged along the workpiece W, a loop is not formed by the first bus bar 36 and the second bus bar 37 so that it is possible to reduce inductance component. As a result, the power factor is not degraded and therefore it is possible to apply a predetermined current to the workpiece W. The movable electrode 50 of the first electrode 12 can be moved relative to the first bus bar 36 and the workpiece W in a contact state and in current-applying state, and the movable electrode 70 of the second electrode 13 can be moved relative to the second bus bar 37 and the workpiece W in a contact state and in current-applying state. Therefore, it is possible to change the region of the workpiece W to which large current is supplied or to change the current-applying time.

Therefore, the relative position between the workpiece W and the first bus bar 36 and the second bus bar 37 is not changed and the constant of a circuit configured by including the workpiece W as a load is not changed.

The current-applying region or the current-applying time can be changed just by moving at least one of the movable electrode 50 of the first electrode 12 and the movable electrode 70 of the second electrode 13. Thus, it is not necessary to make a complicated structure by providing a large number of electrodes or power feeding structures or providing a structure for moving the workpiece W, the first bus bar 36, or the second bus bar 37 as in the related art. The direct resistance heating apparatus 1 can be formed into a simple and compact manner. Accordingly, it is possible to realize a configuration in which a predetermined large current can be easily and simply supplied to the current-applying region of the workpiece W by changing the current-applying region or the current-applying time.

In the direct resistance heating apparatus 1, the movable electrode 50 of the first electrode 12 is arranged between the first bus bar 36 and the workpiece W, and the movable electrode 70 of the second electrode 13 is arranged between the second bus bar 37 and the workpiece W. Thus, it is possible to shorten a power feeding path from the first bus bar 36 to the workpiece W and a power feeding path from the second bus bar 37 to the workpiece W and to reduce the loss.

Since the movable electrode 50 of the first electrode 12 is the current-applying roller 55 and the movable electrode 70 of the second electrode 13 is the current-applying roller 75, the mechanical resistance when the movable electrodes 50 and 70 are moved can be reduced and the movable electrodes can be easily moved even in a state in which the movable electrodes are brought into contact with the workpiece W over a long range. Accordingly, it is possible to efficiently heat the heating target region of the workpiece W by increasing the contact length with the workpiece W. Further, when the movable electrode 50 is the current-applying roller 55 and the movable electrode 70 is the current-applying roller 75, the movable electrodes can be stably moved in a state in which the movable electrodes are in contact with the surface of the workpiece W. For example, the movable electrodes can be prevented from being floated from the surface of the workpiece W due to vibration or the like, thereby preventing occurrence of spark. Further, even when the movable electrodes 50 and 70 are moved in current-applying state, it is possible to stably supply large current to the workpiece W.

In the direct resistance heating apparatus 1, since the first bus bar 36 extends over the substantially entire length of the movement range of the first holder 10 including the movement range of the movable electrode 50 of the first electrode 12 and the movable electrode 50 and the first bus bar 36 can be always connected in a proximity location when the movable electrode 50 is moved and the power feeding path can be shortened. Further, since the power feeding path from the first bus bar 36 to the workpiece W is not changed when the movable electrode 50 is moved, it is possible to maintain a stable current-applying state. Similarly, the second bus bar 37 extends over the substantially entire length of the movement range of the second holder 11 including the movement range of the movable electrode 70 of the second electrode 13, the movable electrode 70 and the second bus bar 37 can be always connected in a proximity location when the movable electrode 70 is moved and the power feeding path can be shortened. Further, since the power feeding path from the second bus bar 37 to the workpiece W is not changed when the movable electrode 70 is moved, it is possible to maintain a stable current-applying state.

In the direct resistance heating apparatus 1, since the workpiece W is pressed against the movable electrode 50 by the pressing member 52 of the first electrode 12 and the workpiece W is pressed against the movable electrode 70 by the pressing member 72 of the second electrode 13, the movable electrodes 50 and 70 can be prevented from being floated from the surface of the workpiece W when the movable electrodes 50 and 70 are moved and current can stably be applied to workpiece W. Since the current is applied by bringing the movable electrodes 50 and 70 into contact with the workpiece W across the entire length of the heating target region in the width direction, the current can be applied to the entire heating target region when the movable electrodes are moved in one direction intersecting the width direction of the workpiece W. Thus, it is possible to shorten the current-applying time by efficiently heating the workpiece with a simple configuration.

Particularly, since the direct resistance heating apparatus 1 includes the power feeding roller 56 of the first electrode 12 which rolls in contact with the first bus bar 36, it is possible to reduce the moving resistance when the power feeding roller is moved in contact with the surface of the first bus bar 36. Thus, the power feeding roller can be easily moved in a state in which the power feeding roller is brought into contact with the first bus bar 36 over a long range thereof. Similarly, since the direct resistance heating apparatus includes the power feeding roller 76 of the second electrode 13 which rolls in contact with the second bus bar 37, it is possible to reduce the moving resistance when the power feeding roller is moved in a contact with the surface of the second bus bar 37. Thus, the power feeding roller can be easily moved in a state in which the power feeding roller is brought into contact with the second bus bar 37 over a long range thereof. Therefore, a long contact length of the first bus bar 36 and the power feeding roller 56 and a long contact length of the second bus bar 37 and the power feeding roller 76 can be secured and large current can be easily supplied from the first bus bar 36 and the second bus bar 37.

In the direct resistance heating apparatus 1, since the power feeding roller 56 of the first electrode 12 is moved together with the current-applying roller 55, the power feeding path from the first bus bar 36 to the movable electrode 50 can be kept substantially constant when the movable electrode 50 is moved. Similarly, since the power feeding roller 76 of the second electrode 13 is moved together with the current-applying roller 75, the power feeding path from the second bus bar 37 to the movable electrode 70 can be kept substantially constant when the movable electrode 70 is moved. Therefore, it is possible to reduce or eliminate variations in the electrical conditions when the movable electrodes 50 and 70 are moved and thus it is possible to stably supply large current to the workpiece W.

In the direct resistance heating apparatus 1, since the current-applying roller 55 and the power feeding roller 56 of the first electrode 12 come into direct contact with each other while rolling in opposite directions, the peripheral surface of the power feeding roller 56 and the peripheral surface of the current-applying roller 55 do not slide at their mutually contacting portions and the power feeding roller 56 and the current-applying roller 55 can be moved in a state in which the rollers are brought into contact with each other over a wide range with low contact resistance. For this reason, a wide contact width between the surface of the power feeding roller 56 and the surface of the current-applying roller 55 can be secured, so that large current can be easily supplied from the current-applying roller 56 to the current-applying roller 55. Further, since the power feeding path from the first bus bar 36 to the workpiece W is provided by the surface of the power feeding roller 56 and the surface of the current-applying roller 55, the power feeding path can be significantly simplified. Similarly, since the current-applying roller 75 and the power feeding roller 76 of the second electrode 13 come into direct contact with each other while rolling in opposite directions, the peripheral surface of the power feeding roller 76 and the peripheral surface of the current-applying roller 75 do not slide at their mutually contacting portions and the power feeding roller 76 and the current-applying roller 75 can be moved in a state in which the rollers are brought into contact with each other over a wide range with low contact resistance. For this reason, a wide contact width between the wide contact width between the surface of the power feeding roller 76 and the surface of the current-applying roller 75 can be secured, so that large current can be easily supplied from the power feeding roller 76 to the current-applying roller 75. Further, since the power feeding path from the second bus bar 37 to the workpiece W is provided by the surface of the power feeding roller 76 and the surface of the current-applying roller 75, the power feeding path can be significantly simplified. Thus, it is possible to more easily supply large current.

Figure 15:
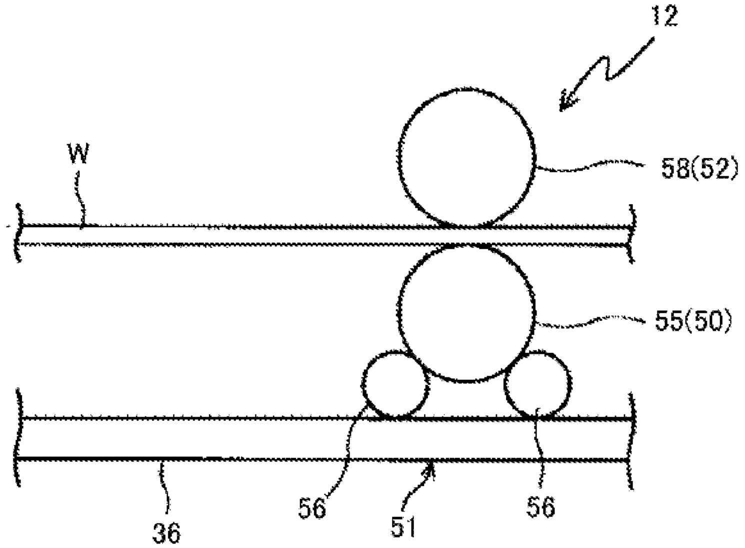
FIG. 15 is a diagram schematically illustrating a modification example of the electrode of FIG. 13.

FIG. 15 illustrates a modification example of the first electrode 12 illustrated in FIGS. 13 and 14.

In the example illustrated in FIGS. 13 and 14, the power feeding roller 56 is mounted on the movement frame 54 such that the power feeding roller is arranged at a predetermined location with respect to the current-applying roller 55, and an axis of the current-applying roller 55 and an axis of the power feeding roller 56 are arranged so as to be overlapped with the same location in the longitudinal direction of the workpiece W and the first bus bar 36. On the contrary, in the modification example illustrated in FIG. 15, each of the rollers 55 and 56 is arranged so as to be shifted from each other in the moving direction of the first electrode 12. In addition to this, a plurality of power feeding roller 56 whose diameter is thinner than that of the current-applying roller 55 is provided back and forth.

When the power feeding roller 56 is arranged at a location shifted with respect to the current-applying rollers 55 in this manner, the workpiece W and the first bus bar 36 can be arranged at adjacent locations. The current-applying roller 75 and the power feeding roller 76 of the second electrode 13 can also be configured similarly and thus the workpiece W and the second bus bar 37 can be arranged adjacent to each other. As a result, it is possible to make inductance smaller and also it is possible to achieve compactness of the direct resistance heating apparatus 1.

Figure 16:
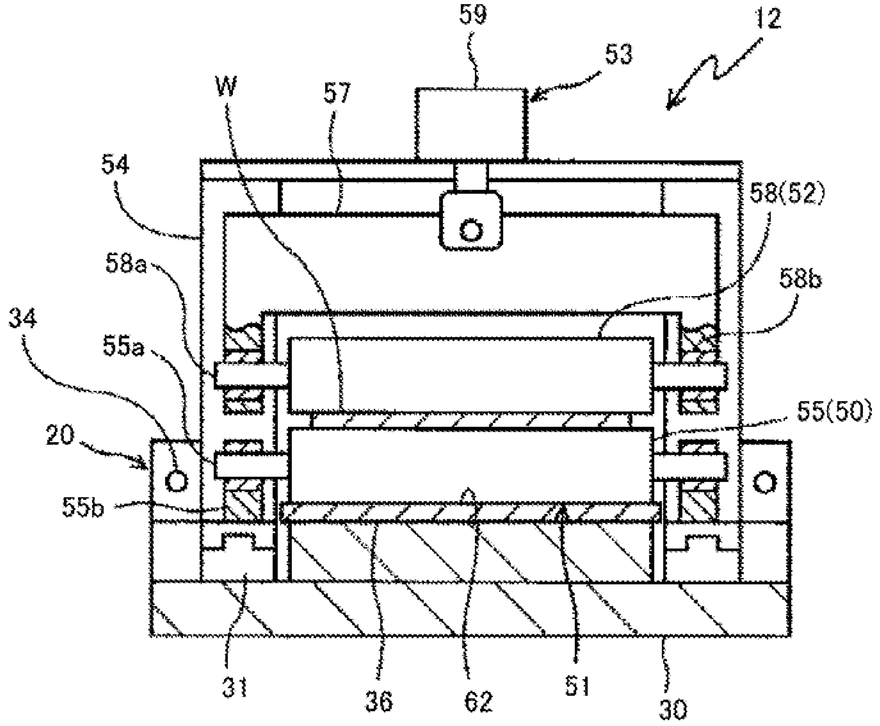
FIG. 16 is a front view of another example of the electrode of the direct re-sistance heating apparatus of FIGS. 1A to 1F.
Figure 17:
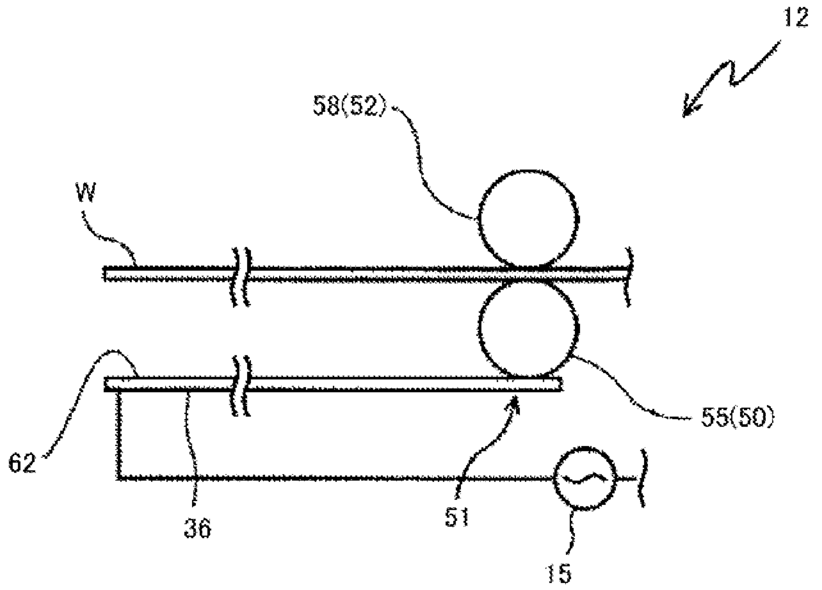
FIG. 17 is a diagram schematically illustrating the electrode of FIG. 16.
Figure 18:
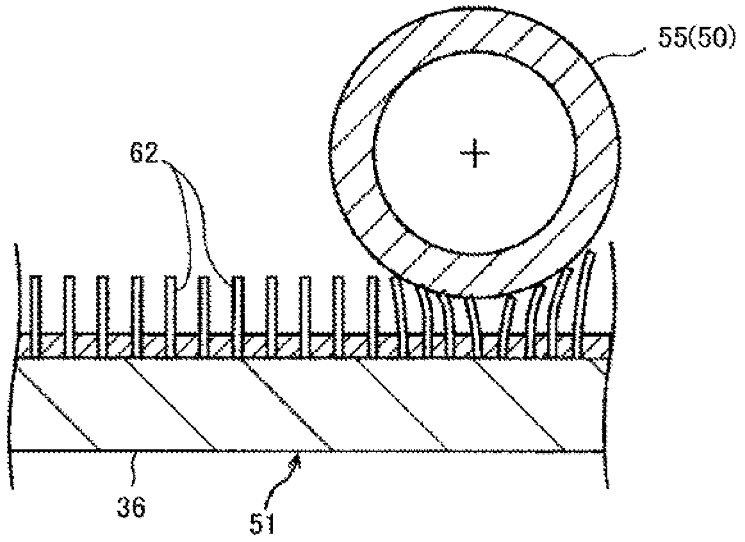
FIG. 18 is an enlarged view of a portion of the electrode in FIG. 17.

FIGS. 16 to 18 illustrate the configuration of another example of the first electrode 12.

The power feeding mechanism 51 illustrated in FIGS. 16 to 18 includes an electrically-conductive brush 62 which is integrally or separately provided on a surface of the first bus bar 36 on the workpiece W side so as to allow the current-applying roller 55 to come into contact therewith and arranged on a substantially entire surface of the first bus bar facing toward the workpiece W. The electrically-conductive brush 62 includes a large number of electrically-conductive fibers and is arranged on the substantially entire surface of the first bus bar facing the heating target region of the workpiece W. The electrically-conductive brush 62 has a thickness to reach a height from the surface of the first bus bar 36 so as to come into contact with the movable electrode 50, and the is elastically deformed when coming into contact with the current-applying roller 55 and comes into contact with the current-applying roller 55 with a suitable contact pressure.

The electrically-conductive brush 62 is configured to have sufficient electrical conductivity to supply sufficient power from the first bus bar 36 to the movable electrode 50 during direct resistance heating. For example, the electrically-conductive brush 62 and the first bus bar 36 are in close contact with each other to provide good electrical conductivity therebetween, the electrically-conductive brush 62 has sufficient electrical conductivity up to its distal end portion that contacts the movable electrode 50, the electrically-conductive brush 62 has heat resistance to prevent occurrence of melting or thermal deformation when current is applied, and deterioration hardly occurs even when the electrically-conductive brush 62 is deformed due to the repetitive contact of the movable electrode.

The electrically-conductive brush 62 can be made in a suitable form, such as one obtained by arranging and bundling linear conductive fibers in the substantially same direction, one obtained by collecting conductive fibers into woven or non-woven fabric shape, one obtained by fixing conductive fibers by other material to allow a portion thereof to protrude, one obtained by molding conductive fibers together with flexible material, and the like. Further, the electrically-conductive brush 62 may be formed integrally with the first bus bar 36 by embedding a portion thereof into a material layer forming the surface of the first bus bar 36. As a material forming conductive fibers, carbon fiber or the like can be exemplified.

In the first electrode 12, when the current-applying roller 55 is moved by the movement frame 54, the current-applying roller 55 rolls in contact with the surface of the workpiece W. At this time, since the current-applying roller 55 moves in sliding contact with the electrically-conductive brush 62 arranged on the surface of the first bus bar 36 and the current from the first bus bar 36 is supplied to the entire peripheral surface of the current-applying roller 55 through the electrically-conductive brush 62, the current-applying roller 55 can be moved in a state in which current is applied to the workpiece W.

In the first electrode 12, since the movable electrode 50 is in sliding contact with the electrically-conductive brush 62 of the first bus bar 36, the contact resistance of the movable electrode 50 can be reduced and the first bus bar 36 and the movable electrode 50 can move in contact with each other over a long range. Therefore, a long contact length between the movable electrode 50 and the first bus bar 36 can be secured and large current can be supplied more easily from the first bus bar 36 to the movable electrode 50. Further, since the power feeding path from the first bus bar 36 to the workpiece W is configured by the electrically-conductive brush 62 and the movable electrode 50, the configuration can be significantly simplified.

In the first electrode 12, since the electrically-conductive brush 62 is arranged to oppose to the substantially entire region of the heating target region of the workpiece W, power can be fed to each portion of the heating target region from each facing portion of the electrically-conductive brush 62. Therefore, the power feeding path from the electrically-conductive brush 62 to the workpiece W can be shortened and substantially fixed and current can be applied to the entire heating target region in a uniform manner.

The power feeding mechanism 71 of the second electrode 13 can also be configured similarly and may include an electrically-conductive brush which is integrally or separately provided on the surface of the second bus bar 37 on the workpiece W side so as to allow the current-applying roller 75 to come into contact therewith and arranged on the substantially entire surface of the second bus bar facing toward the workpiece W.

Figure 19:
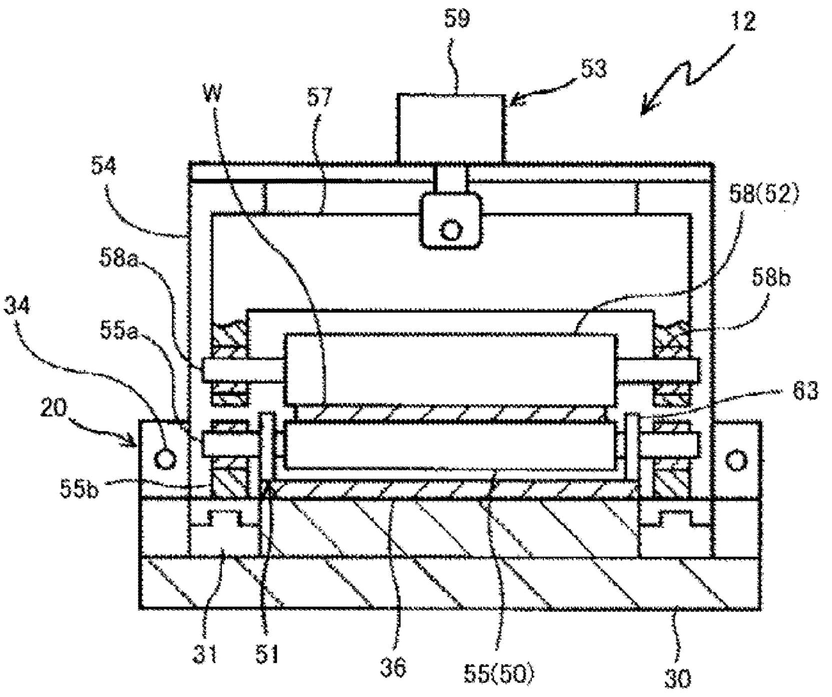
FIG. 19 is a front view of another example of the electrode of the direct re-sistance heating apparatus of FIGS. 1A to 1F.
Figure 20:
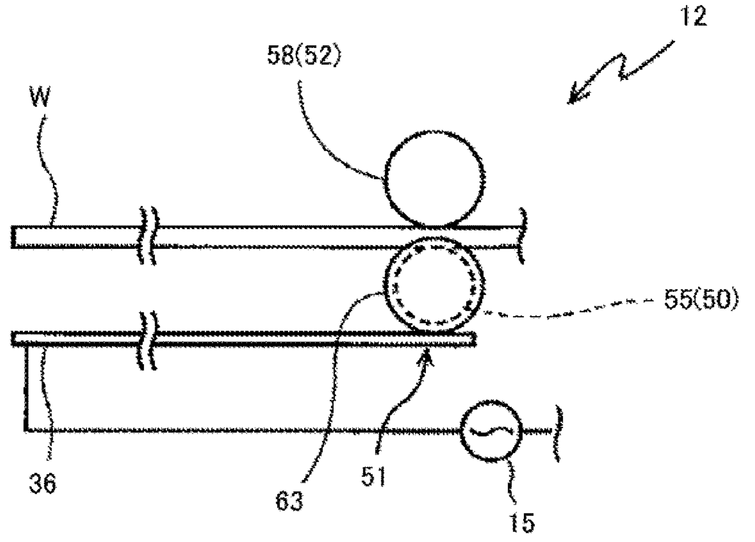
FIG. 20 is a diagram schematically illustrating the electrode of FIG. 19.

FIGS. 19 and 20 illustrates the configuration of another example of the first electrode 12.

The power feeding mechanism 51 of the first electrode 12 illustrated in FIGS. 19 and 20 includes power feeding rollers 63 configured to contact and roll on the surface of the first bus bar 36. Each of the power feeding rollers 63 has a diameter larger than a diameter of the current-applying roller 55 and is mounted on the shaft portion 55*a* at each end of the current-applying roller 55. The power feeding roller 63 may be fixed to the shaft portion 55*a* or may be pivotably mounted to the shaft portion 55*a* through a slide bearing formed of metal or the like softer than the shaft portion 55*a*. It is desirable that sufficient electrical conductivity is ensured between the peripheral surface of the power feeding roller 63 and the shaft portion 55*a*.

In the first electrode 12, when the current-applying roller 55 and the power feeding roller 63 are moved, in a state in which the current-applying roller 55 is in contact with the workpiece W, the power feeding roller 63 can moves in contact with the first bus bar 36.

As the pressing member 52 is pressed, the workpiece W is pressed against the current-applying roller 55. Since the power feeding roller 63 has a diameter larger than the diameter of the current-applying roller 55, in a state in which the current-applying roller 55 is separated from the surface of the first bus bar 36, the current-applying roller is pressed against the workpiece W. Since the power feeding roller 63 is arranged on the outside of both sides of the workpiece W, the power feeding roller is pressed against both edge sides of the first bus bar 36 without contact with the workpiece W.

In the first electrode 12, since the power feeding rollers 63 are provided at respective ends of the movable electrode 50 and are moved in contact with the first bus bar 36, a space between the first bus bar 36 and the workpiece W can be reduced. Further, it is possible to reduce the moving resistance to the first bus bar 36 or the moving resistance to the workpiece W regardless of the size of the movable electrode 50. Therefore, large current can be supplied more easily.

Although the current-applying roller 55 and the power feeding roller 63 are mounted on the same shaft, the current-applying roller and the power feeding roller may be mounted on different shafts such that the current-applying roller 55 and the power feeding roller 63 are electrically connected.

The power feeding mechanism 71 of the second electrode 13 can also be configured in a similar manner. The power feeding mechanism may include power feeding rollers configured to contact and roll on the surface of the second bus bar 37. Each of the power feeding rollers may have a diameter larger than a diameter of the current-applying roller 75 and may be mounted on the shaft portion 75*a* at each end of the current-applying roller 75 or on a shaft different from the shaft portion 75*a*.

In the first electrode 12 having the movable electrode 50 which comes into contact with the workpiece W and the pressing member 52 which is arranged to oppose to the movable electrode 50, the workpiece W is held by the movable electrode 50 and the pressing member 52 so as to hold the workpiece W. In the same manner, in the second electrode 13 having the movable electrode 70 which comes into contact with the workpiece W and the pressing member 72 which is arranged to oppose to the movable electrode 70, the workpiece W is held by the movable electrode 70 and the pressing member 72 so as to hold the workpiece W. The first holder 10 may be configured to include the first electrode 12 so as to hold the workpiece W by the first electrode 12 and the second holder 11 may be configured to include the second electrode 13 so as to hold the workpiece W by the second electrode 13. Accordingly, compared to a configuration in which the first holder 10 and the second holder 11 are provided separately from the first electrode 12 and the second electrode 13, the apparatus configuration can be simplified.

Figure 21:
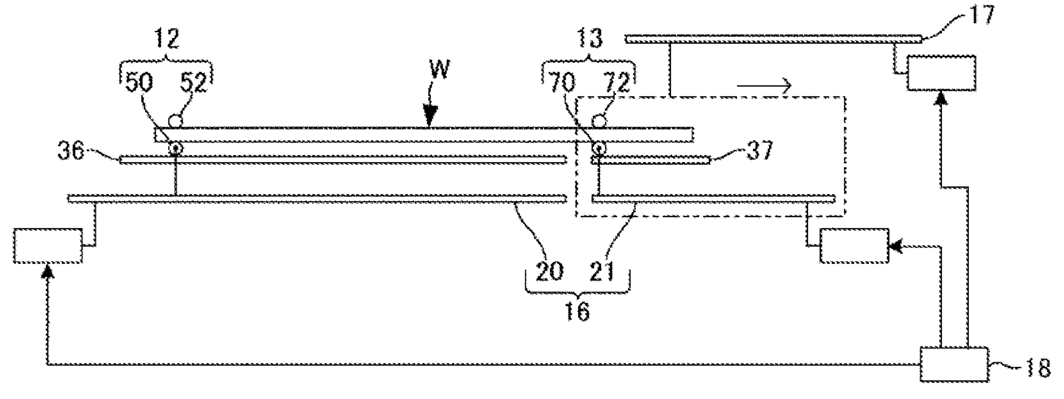
FIG. 21 is a diagram schematically illustrating a modification example of the direct resistance heating apparatus of FIGS. 1A to 1F.

In a case where the first holder 10 is configured to include the first electrode 12 so as to hold the workpiece W by the first electrode 12 and the second holder 11 configured to include the second electrode 13 so as to hold the workpiece W by the second electrode 13, as illustrated in FIG. 21, the holder moving mechanism 17 moves the second holder 11, and preferably, the holder moving mechanism 17 moves the second bus bar 37 for feeding power to the movable electrode 70 of the second electrode 13 integrally with the movable electrode 70 and the pressing member 72 holding the workpiece W. Accordingly, sliding of the second electrode 13 and the second bus bar 37 is prevented and wear of the second electrode 13 is suppressed.

The examples in which the entire region or a part of the workpiece is set as one heating target region and the heating target region is heated by direct resistance heating to be within a predetermined temperature range have been described above. However, in examples described below, a heating target region of a workpiece is divided into a plurality of heating target regions and the plurality of heating target regions is heated by direct resistance heating in different temperature ranges from each other by the direct resistance heating apparatus 1.

A workpiece W5 in the example illustrated in FIGS. 22A to 22G is formed into a trapezoidal shape in which the thickness is constant and the width is gradually decreased from one end portion R to the other end portion L in the longitudinal direction and the entire region is a heating target region. The workpiece W5 includes a first heating target region W5*a* which is a relatively narrow region formed on the end portion L side and heated to a hot working temperature, that is, a quenching temperature, and a second heating target region W5*b* which has a relatively wide region formed on the end portion R side and heated to a warm working temperature lower than the quenching temperature. The workpiece W5 may include regions other than the first heating target region W5*a* and the second heating target region W5*b*. The workpiece W5 is a so-called tailored blank which is an integrated body obtained by joining both regions of the first heating target region W5*a* and the second heating target region W5*b* formed of different materials by welding at a weld bead portion W5*c*. Here, the tailored blank is an integrated material obtained by joining the steel materials having different thickness or strength by welding or the like and is a state before being processed in press or the like. While the first heating target region W5*a* is heated to the hot working temperature, the second heating target region W5*b* is heated to the warm working temperature, so that these regions are easily pressed in a subsequent process.

Figure 22A:
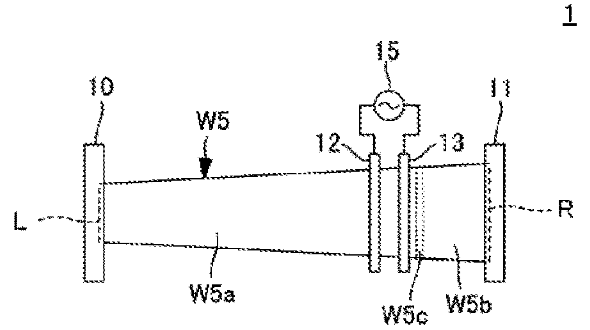
FIG. 22A is a diagram illustrating a direct resistance heating method according to another embodiment of the present invention.
Figure 22B:
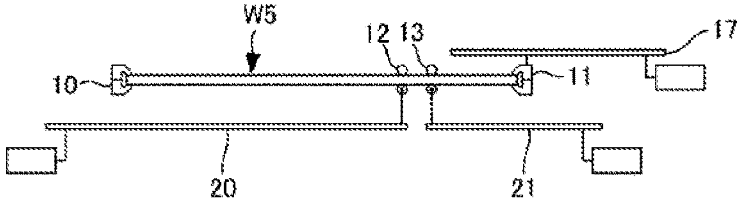
FIG. 22B is a diagram illustrating the direct resistance heating method together with FIG. 22A.

First, as illustrated in FIGS. 22A and 22B, the first electrode 12 and the second electrode 13 are arranged at an intermediate portion in the heating target region. In the example, the electrodes are arranged on the first heating target region W5*a* to be spaced apart from each other. However, at this time, the second electrode 13 is arranged on the first heating target region W5*a* not to touch the weld bead portion W5*c*.

Thereafter, while current is being applied between the first electrode 12 and the second electrode 13, in a state in which the second electrode 13 is fixed without moving, the first electrode 12 is moved by the first moving unit 20 in a direction opposite to the moving direction of the second electrode 13, and the space between the first electrode 12 and the second electrode 13 is widened.

Figure 22C:
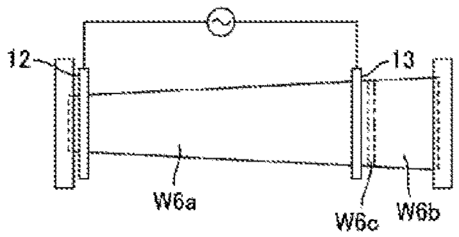
FIG. 22C is a diagram illustrating the direct resistance heating method together with FIGS. 22A and 22B.
Figure 22D:
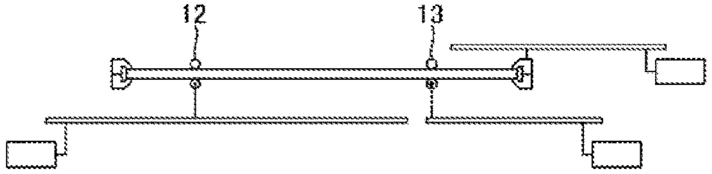
FIG. 22D is a diagram illustrating the direct resistance heating method together with FIGS. 22A to 22C.

Then, as illustrated in FIGS. 22C and 22D, before the first electrode 12 reaches one end of the heating target region (in the drawing, the end portion L), the second electrode 13 is moved in a direction opposite to the moving direction of the first electrode 12 by the second moving unit 21. The first electrode 12 and the second electrode 13 may reach each end of the heating target region at the same time. In this manner, the second heating target region W5*b* is heated to the extent that the load is not applied to the workpiece W5 in a subsequent pressing process. Thus, as illustrated in FIGS. 22E and 22F, the first electrode 12 and the second electrode 13 are moved by the first moving unit 20 and the second moving unit 21, respectively, and reach each end of the heating target region of the workpiece W5, so that the space between the electrodes is widened.

The current application to the workpiece W5 is terminated, in a state in which the second electrode 13 is separated from the workpiece W5, the second holder 11 is moved in the longitudinal direction of the workpiece W5 and the workpiece W5 is pulled in the longitudinal direction to make the workpiece W5 flat.

Figure 22E:
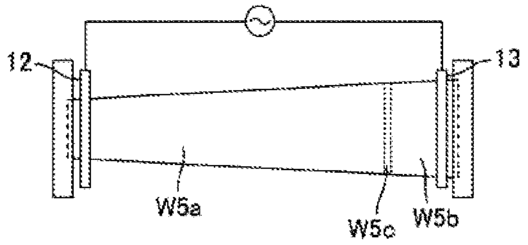
FIG. 22E is a diagram illustrating the direct resistance heating method together with FIGS. 22A to 22D.
Figure 22F:
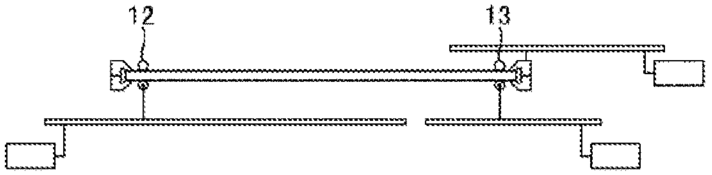
FIG. 22F is a diagram illustrating the direct resistance heating method together with FIGS. 22A to 22E.
Figure 22G:
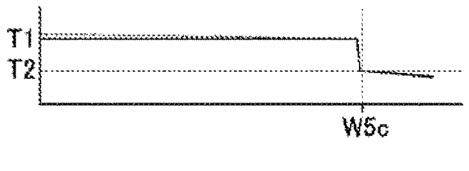
FIG. 22G is a diagram illustrating the direct resistance heating method together with FIGS. 22A to 22F.
Figure 23A:
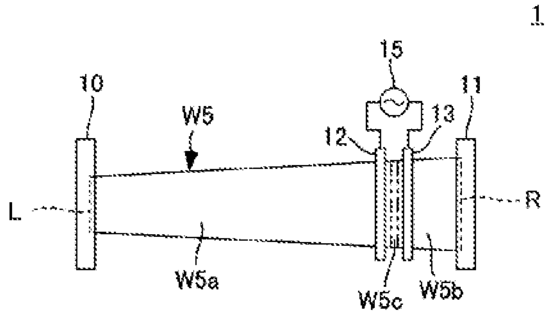
FIG. 23A is a diagram illustrating a direct resistance heating method according to another embodiment of the present invention.
Figure 23B:
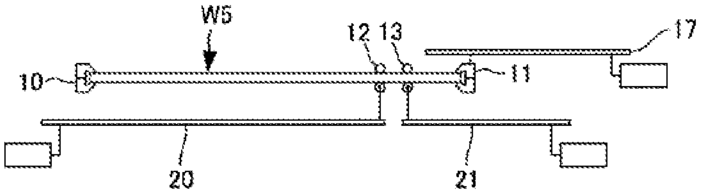
FIG. 23B is a diagram illustrating the direct resistance heating method together with FIG. 23A.
Figure 23C:
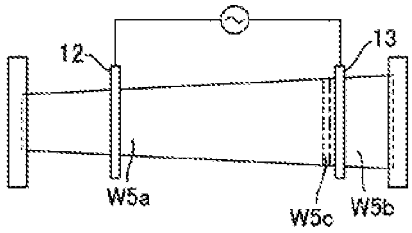
FIG. 23C is a diagram illustrating the direct resistance heating method together with FIGS. 23A and 23B.
Figure 23D:
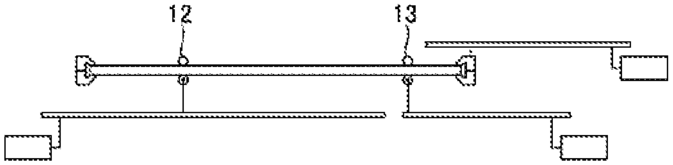
FIG. 23D is a diagram illustrating the direct resistance heating method together with FIGS. 23A to 23C.
Figure 23E:
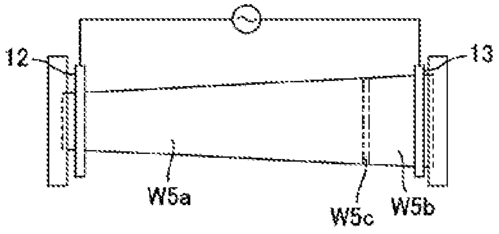
FIG. 23E is a diagram illustrating the direct resistance heating method together with FIGS. 23A to 23D.
Figure 23F:
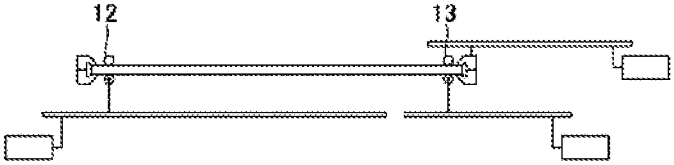
FIG. 23F is a diagram illustrating the direct resistance heating method together with FIGS. 23A to 23E.
Figure 23G:
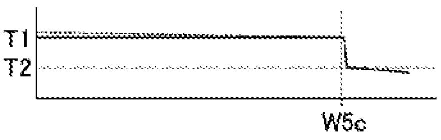
FIG. 23G is a diagram illustrating the direct resistance heating method together with FIGS. 23A to 23F.

Through the above process, for example, as illustrated in FIG. 22G, the heating temperature of the first heating target region W5*a* on the end portion L side of the weld bead portion W5*c* is T1 and the heating temperature of the second heating target region W5*b* on the end portion R side of the weld bead portion W5*c* is T2 (<T1). Accordingly, the heating target region of the workpiece W5 is heated such that the heating target region is divided into a high temperature region and a low temperature region. Then, the workpiece W5 heated in this manner is formed into a predetermined shape through pressing.

Here, in a case where the first electrode 12 is moved to heat the first heating target region W5*a* so that a state illustrated in FIGS. 22A and 22B is changed to a state illustrated in FIGS. 22E and 22F, the sectional area of the first heating target region W5*a* monotonically decreases along the moving direction of the first electrode 12. Accordingly, when the amount of heat generated in each segment region in a case where the first heating target region W5*a* is divided into a plurality of strip-shaped segment regions arranged side by side in the longitudinal direction is adjusted by controlling at least one of the moving speed of the first electrode 12 and the amount of current passing through the workpiece W5, the first heating target region W5*a* can be uniformly heated to the temperature T1 as indicated by a solid line illustrated in FIG. 22G.

Further, in a case where the amount of heat generated in each segment region of the first heating target region W5*a* is adjusted by controlling at least one of the moving speed of the first electrode 12 and the amount of current passing through the workpiece W5, the first heating target region W5*a* can be heated to have a temperature distribution, for example, as indicated by a dotted line in FIG. 22G.

In both cases, since the sectional area of the second heating target region W5*b* of the workpiece W5 is increased in the moving direction of the second electrode 13, the temperature rise in the second heating target region W5*b* including the location of the weld bead portion W5*c* is decreased as it becomes farther from the weld bead portion W5*c* as illustrated in FIG. 22G. Essentially, since the second heating target region W5*b* is not a region to be quenched and a temperature range of warm working is sufficient for the second heating target region, it is less necessary to heat the second heating target region uniformly.

Thus, the first heating target region W5*a* is heated to the hot working temperature by direct resistance heating and the second heating target region W5*b* is heated to the warm working temperature by direct resistance heating. In this manner, each of the first heating target region W5*a* and the second heating target region W5*b* can be heated to different temperatures by using the pair of electrodes 14 and individually moving the first electrode 12 and the second electrode 13 in the opposite directions on the workpiece W5 which is fixed.

The example illustrated in FIGS. 23A to 23G is different from the above example illustrated in FIGS. 22A to 22G in that, before the start of direct resistance heating, the first electrode 12 is arranged on the first heating target region W5*a* and the second electrode 13 is arranged on the second heating target region W5*b*. In the example illustrated in FIGS. 22A to 22G, before the start of direct resistance heating, both the first electrode 12 and the second electrode 13 are arranged on the first heating target region W5*a* and the weld bead portion W5*c* is not heated to a high temperature but heated to a low temperature. In contrast, in the example, the first electrode 12 and the second electrode 13 are arranged at both sides of the weld bead portion W5*c* before direct resistance heating, the first electrode 12 is moved toward the end portion L and then the second electrode 13 is moved toward the end of the second heating target region W5*b* before the first electrode 12 reaches the end of the first heating target region W5*a*. The first electrode 12 and the second electrode 13 may reach each end of the heating target region at the same time. This results in the weld bead portion W5*c* being heated to a high temperature.

As in the example illustrated in FIGS. 22A to 22G and the example illustrated in FIGS. 23A to 23G, when the workpiece W5 is a blank having a weld bead portion W5*c* at which a plurality of plates made of different materials and/or having different thicknesses are joined, it is possible to control whether the weld bead portion W5*c* and its vicinity are heated to a high temperature or a low temperature, in accordance with a locational relationship among the first electrode 12, the second electrode 13 and the weld bead portion W5*c*.

As in the example illustrated in FIGS. 22A to 22G, the first electrode 12 and the second electrode 13 are arranged on one steel plate to be spaced apart from each other and the electrode that is farther from the weld bead portion W5*c*, that is, the first electrode 12 is moved so as to widen the space between the first electrode and the second electrode 13. Then, both the first electrode 12 and the second electrode 13 are moved in the opposite directions before the first electrode 12 reaches one end of the one steel plate such that the second electrode 13 is moved across the weld bead portion W5*c* and reaches one end of the other steel plate. In this case, the weld bead portion W5*c* is heated only to a low temperature. Further, a region which is not heated to a high temperature remains between one steel plate on the first heating target region W5*a* side which is heated to a high temperature and a contact point with the second electrode 13. The region which is not heated to a high temperature corresponds to the portion in the vicinity of the weld bead portion W5*c* described above.

Meanwhile, as in the example illustrated in FIGS. 23A to 23G, the first electrode 12 is arranged on the one steel plate, the second electrode 13 is arranged on the other steel plate, and the weld bead portion W5*c* is provided between the first electrode 12 and the second electrode 13. Then, the first electrode 12 and the second electrode 13 are moved in the opposite directions so that the first electrode 12 arranged on the one steel plate on the first heating target region W5*a* side which is heated to a high temperature is far away from the second electrode 13 and the second electrode 13 reaches one end of the other steel plate before the first electrode 12 reaches one end of the one steel sheet. In this case, the weld bead portion W5*c* is heated to a high temperature. Further, a region which is heated to a high temperature exists between the other steel plate on the second heating target region W5*b* side which is heated to a low temperature and a contact point with the second electrode 13.

A workpiece W6 in the example illustrated in FIGS. 24A to 24I is considered as a tailored blank as the workpiece W5 in the example illustrated in FIGS. 22A to 22G, one side of left and right sides of the workpiece W6 is a first heating target region W6*a* which is heated to a hot working temperature, that is, a quenching temperature, and the other side is a second heating target region W6*b* which is heated to a warm working temperature lower than the quenching temperature.

The workpiece W6 is different from the workpiece W5 in the example illustrated in FIGS. 22A to 22G in that there is a difference between the thickness of one steel plate on the first heating target region W6*a* side and the thickness of the other steel plate on the second heating target region W6*b* side. Although the steel plate on the second heating target region W6*b* side is thicker than the steel plate on the first heating target region W6*a* side in the example shown in the drawings, on the contrary, the steel plate on the first heating target region W6*a* side may be thicker than the steel plate on the second heating target region W6*b* side. The weld bead portion W6*c* is inclined due to a difference in the thickness of the steel plates and, in some cases, irregularities are caused by welding. In this case, the current is not directly applied to the weld bead portion W6*c*. This is because a spark is generated when the electrode slides on the weld bead portion W6*c* in a state in which the current is applied from the power supply 15 to the electrode. In this case, each of the first heating target region W6*a* and the second heating target region W6*b* on both sides of the weld bead portion W6*c* interposed therebetween is heated by direct resistance heating, so that the weld bead portion W6*c* is heated by heat transfer from the first heating target region W6*a* and the second heating target region W6*b*.

Figure 24A:
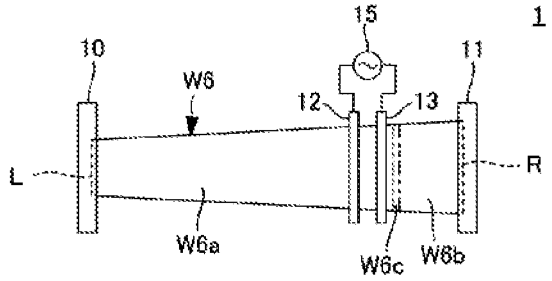
FIG. 24A is a diagram illustrating a direct resistance heating method according to another embodiment of the present invention.
Figure 24B:
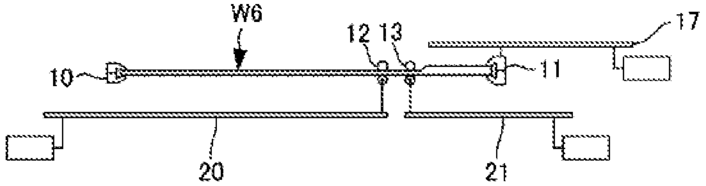
FIG. 24B is a diagram illustrating the direct resistance heating method together with FIG. 24A.

First, as illustrated in FIGS. 24A and 24B, the second electrode 13 is arranged on the right end of the first heating target region W6*a* so as not to touch the weld bead portion W6*c*. The first electrode 12 is arranged on the first heating target region W6*a* in a state of being spaced apart from the second electrode 13. The first heating target region W6*a* of the workpiece W6 has a larger sectional area on the right side.

Figure 24C:
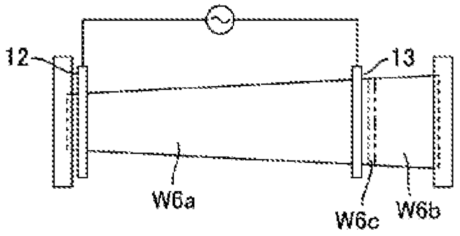
FIG. 24C is a diagram illustrating the direct resistance heating method together with FIGS. 24A and 24B.
Figure 24D:
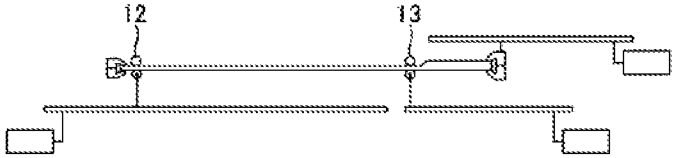
FIG. 24D is a diagram illustrating the direct resistance heating method together with FIGS. 24A to 24C.

Thereafter, in a state in which the second electrode 13 is fixed with current being applied between the first electrode 12 and the second electrode 13, the first electrode 12 is moved by the first moving unit 20 in a direction opposite to the moving direction of the second electrode 13, and the space between the first electrode 12 and the second electrode 13 is widened. As illustrated in FIGS. 24C and 24D, when the first electrode 12 reaches the other end of the first heating target region W6*a*, the current is stopped from being applied. The current application to the workpiece W6 is terminated, in a state in which the second electrode 13 is separated from the workpiece W6, the second holder 11 is moved in the longitudinal direction of the workpiece W6, and the workpiece W6 is pulled in the longitudinal direction to make the workpiece W6 flat.

Figure 24E:
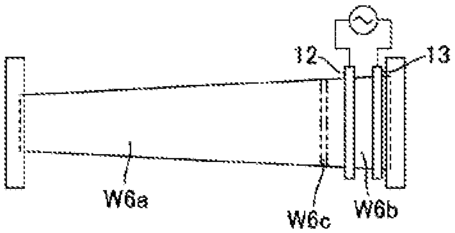
FIG. 24E is a diagram illustrating the direct resistance heating method together with FIGS. 24A to 24D.
Figure 24F:
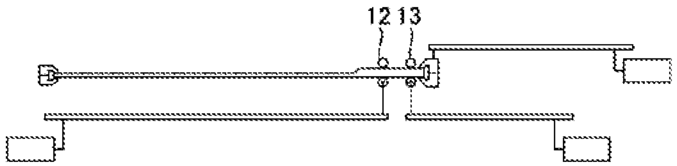
FIG. 24F is a diagram illustrating the direct resistance heating method together with FIGS. 24A to 24E.

Then, as illustrated in FIGS. 24E and 24F, the workpiece W6 is shifted to the left direction and the first electrode 12 and the second electrode 13 are arranged in a predetermined location in the second heating target region W6*b*. That is, the second electrode 13 is arranged on the right end of the second heating target region W6*b* and the first electrode 12 is arranged on the second heating target region W6*b* in a state of being spaced from the second electrode 13. The second heating target region W6*b* of the workpiece W6 has a larger sectional area on the right side.

Figure 24G:
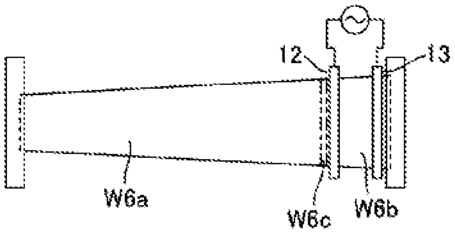
FIG. 24G is a diagram illustrating the direct resistance heating method together with FIGS. 24A to 24F.
Figure 24H:
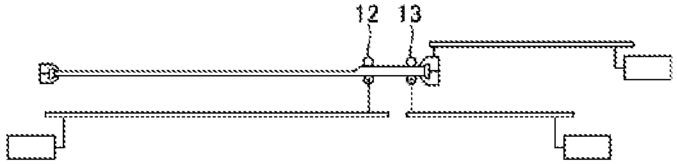
FIG. 24H is a diagram illustrating the direct resistance heating method together with FIGS. 24A to 24G.

Thereafter, in a state in which the second electrode 13 is fixed with current being applied between the first electrode 12 and the second electrode 13, the first electrode 12 is moved by the first moving unit 20 in a direction opposite to the moving direction of the second electrode 13 and the space between the first electrode 12 and the second electrode 13 is widened. As illustrated in FIGS. 24G and 24H, when the first electrode 12 reaches the other end of the second heating target region W6*b*, the current is stopped from being applied. At this time, the first electrode 12 does not come into contact with the weld bead portion W6*c*. The current application to the workpiece W6 is terminated, in a state in which the second electrode 13 is separated from the workpiece W6, the second holder 11 is moved in the longitudinal direction of the workpiece W6 and the workpiece W6 is pulled in the longitudinal direction to make the workpiece W6 flat.

Figure 24I:
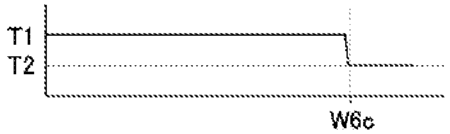
FIG. 24I is a diagram illustrating the direct resistance heating method together with FIGS. 24A to 24H.

Through the above process, for example, as illustrated in FIG. 24I, the heating temperature of the first heating target region W6*a* on the left side of the weld bead portion W6*c* is T1 and the heating temperature of the second heating target region on the right side of the weld bead portion is T2 (<T1). Accordingly, the heating target region of the workpiece W6 can be heated such that the heating target region is divided into a high temperature region and a low temperature region. In the example, the current is not directly applied to the weld bead portion W6*c*. However, since the first heating target region W6*a* and the second heating target region W6*b* are heated by direct resistance heating, the weld bead portion W6*c* is heated by heat transfer from both sides thereof. The workpiece W6 heated as described above is formed into a predetermined shape through pressing.

As illustrated in FIG. 24I, the temperature distribution of each of the first heating target region W6*a* and the second heating target region W6*b* is substantially uniform for each of the regions. This is because at least one of the moving speed of the first electrode 12 and the second electrode 13 and the amount of current passing through the workpiece W6 are controlled based on the shapes and sizes of the first heating target region W6*a* and the second heating target region W6*b* to uniformly heat the regions.

The direct resistance heating method described above can be used in, for example, quenching performed by rapid cooling after heating and can also be used in hot-press press molding in which the workpiece in a high temperature state after heating is molded by pressing using a press mold. According to the above-described direct resistance heating method, it is sufficient to configure the heating equipment only with a simple construction, and thus the heating equipment can be provided adjacent to or integrally with the press machine. Therefore, the workpiece can be press-molded in a short period of time after being heated and temperature drop of the heated workpiece is suppressed to reduce energy loss. In addition, it is possible to prevent surface oxidation of the workpiece, thereby preparing a high quality press-molded article.

The examples in which the workpiece having relatively simple shapes such as a substantially rectangular shape and a substantially trapezoidal shape is heated by direct resistance heating have been described above. However, the direct resistance heating apparatus 1 can also be used in heating a workpiece formed by combining a plurality of shapes.

In the following description, an example in which a plate workpiece is heated and quenched by cooling will be described. In the example illustrated in FIGS. 25A to 25D, a plate workpiece W7 to be heated is a deformed plate formed of a steel material, a shape of which will be formed into a desired product shape, specifically, a B pillar of a vehicle.

Figure 25A:
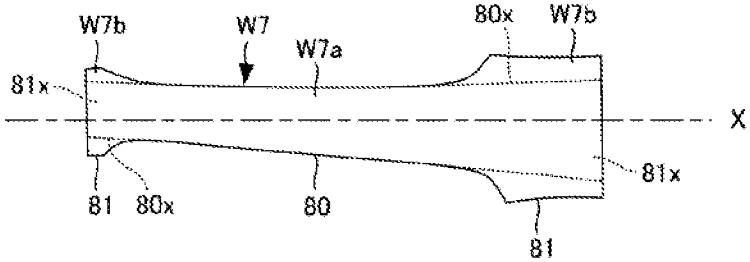
FIG. 25A is a diagram illustrating a heating apparatus and a heating method according to another embodiment of the present invention.

As illustrated in FIG. 25A, the plate workpiece W7 has a first heating target region W7*a* in which the sectional area in the width direction monotonically increases or monotonically decreases along the longitudinal direction, and a plurality of second heating target regions W7*b* which are adjoining a portion of the first heating target region W7*a* and provided integrally with the first heating target region, specifically, both sides in the width direction at both ends in the longitudinal direction. The entire plate workpiece W7 is formed at a substantially constant thickness and the width of the first heating target region W7*a* monotonically increases or monotonically decreases in one direction in the longitudinal direction.

The sectional area in the width direction monotonically increases or monotonically decreases in one direction in the longitudinal direction means that a variation in the sectional area in the longitudinal direction, that is, the sectional area at each location in longitudinal direction increases or decreases in one direction without an inflection point. The sectional area can be considered as monotonically increasing or monotonically decreasing, if a partial low-temperature portion or a partial high-temperature portion, which may be practically problematic, is not generated due to current density at the time of direct resistance heating being excessively non-uniform in the width direction as a result of a sharp variation in the sectional area in the longitudinal direction. The sectional area in the width direction may be substantially continuously uniform in the longitudinal direction.

The plate workpiece W7 includes a narrow portion 80 extending along a long axis X and wide portions 81 integrally provided at both ends of the narrow portion 80. The first heating target region W7*a* is formed by the narrow portion 80, extended portions 81*x* defined in the wide portions 81 by boundary lines 80*x* obtained by respectively extending both side edges of the narrow portion 80 along the long axis X. The long axis X can be appropriately set to a line extending in the longitudinal direction.

Figure 25B:
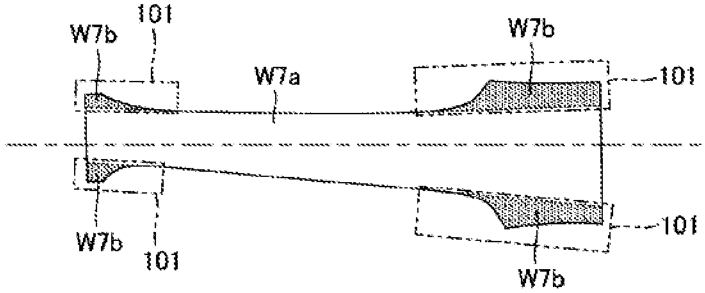
FIG. 25B is a diagram illustrating the heating apparatus and the heating method together with FIG. 25A.
Figure 25C:
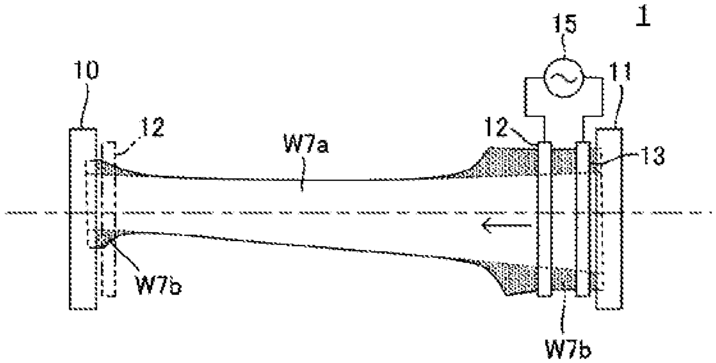
FIG. 25C is a diagram illustrating the heating apparatus and the heating method together with FIGS. 25A and 25B.
Figure 25D:
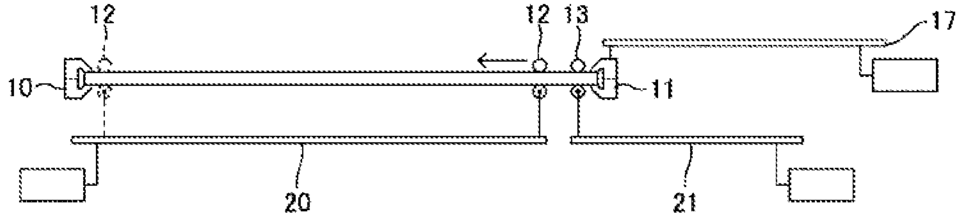
FIG. 25D is a diagram illustrating the heating apparatus and the heating method together with FIGS. 25A to 25C.

A heating apparatus for heating the plate workpiece W7 includes the direct resistance heating apparatus 1, an example of a first heating section configured to heat the first heating target region W7*a* as illustrated in FIGS. 25C and 25D and a second heating section 101 configured to heat the second heating target region W7*b* as illustrated in FIG. 25B.

It is preferable that the second heating section 101 is designed to restrict heating of the first heating target region W7*a* when heating the second heating target region W7*b* as illustrated in FIG. 25B. For example, the second heating section may heat the second region by direct resistance heating using a pair of electrodes by bringing the electrodes into contact with the second heating target region W7*b*, may be heated by induction heating by moving a coil close to the second heating target region W7*b*, or may be heated by furnace heating by placing and heating a part of the second heating target region W7*b* in a heating furnace. Further, the second heating target region may be heated by bringing a heater, which is heated up to a predetermined temperature, into contact with the second heating target region. In a case where the second heating target region W7*b* is heated by direct resistance heating by being brought into contact with the pair of electrodes, when a high frequency current is applied, an outer edge side of the second heating target region W7*b* is strongly heated due to the skin effect, and thus only the second heating target region W7*b* can be easily heated.

The plate workpiece W7 is heated in the following manner using such a heating apparatus. First, as illustrated in FIG. 25A, the first heating target region W7*a* and the second heating target region W7*b* of the plate workpiece W7 are defined. The first heating target region W7*a* and the second heating target region W7*b* can be defined in an optional manner, but the shapes of the regions are preferably set as shapes that can be easily heated as uniform as possible. In the illustrated example, the boundary lines 80*x* are defined on end portions of the plate workpiece W in the longitudinal direction by extending both side edges of the narrow portion 80 along the long axis L respectively, whereby the extended portions 81*x* are defined in the wide portions 81 by the boundary lines 80*x*. Then, the narrow portion 80 and the extended portions 81*x* at respective ends thereof are collectively defined as the first heating target region W7*a*, and regions between the boundary lines 80*x* and the side edges of the wide portions 81 are collectively defined as the second heating target region W7*b*.

Next, as illustrated in FIG. 25B, the second heating target region W7*b* is arranged in the second heating section 101 to heat the second heating target region W7*b*. At this time, when the second heating target region W7*b* is heated without heating the first heating target region W7*a*, the second heating target region W7*b* is heated to a high temperature state and the first heating target region W7*a* is maintained in a low temperature state. Therefore, the resistance of the second heating target region W7*b* is higher than the resistance of the first heating target region W7*a*, thereby forming current flowing path for subsequent direct resistance heating of the first heating target region W7*a*.

When heating of the second heating target region W7*b* is terminated, it is preferable that the second heating target region W7*b* is heated to a temperature higher than a target heating temperature. Consequently, it is possible to heat the second heating target region W7*b* to be within a predetermined temperature range even when the temperature of the second heating target region is lowered by heat dissipation until the first heating target region W7*a* is subsequently heated by direct resistance heating.

Next, after the second heating target region W7*b* is heated, as illustrated in FIGS. 25C and 25D, the first heating target region W7*a* is heated by direct resistance heating in the longitudinal direction by moving the first electrode 12 in the longitudinal direction while supplying current between the first electrode 12 and the second electrode 13 from the power supply by bringing the first electrode 12 and the second electrode 13 of the direct resistance heating apparatus 1 into contact with the plate workpiece W7. As the first electrode 12 is moved, at an initial heating stage, current is applied to a partial range of the first heating target region W7*a* in the longitudinal direction and as the first electrode 12 is further moved, current-applying range of the first heating target region is enlarged. At a final heating stage, the current flows through the first heating target region W7*a* over the substantially entire length.

Since the second heating target region W7*b* is heated to a high temperature at this time, the resistance of the second heating target region W7*b* is increased. This allows the current to flow a lot through the first heating target region W7*a* maintained at low temperature, thereby heating the first heating target region W7*a*. Thus, the first heating target region W7*a* is heated to be within a predetermined temperature range around a target temperature.

The first heating target region W7*a* and the second heating target region W7*b* are heated to be within a predetermined temperature range by adjusting the heating temperature of the second heating target region W7*b* and the heating timing of the first heating target region W7*a*. Meanwhile, according to the amount of time or heat transfer between the heating of the second heating target region W7*b* and the direct resistance heating of the first heating target region W7*a*, the temperature of the second heating target region W7*b* may often be lowered due to heat dissipation. When the second heating target region W7*b* is excessively heated at the time of heating, the temperature of the heated first heating target region W7*a* and the temperature of the heat-dissipated second heating target region W7*b* are equal to each other and the first heating target region W7*a* and the second heating target region W7*b* can be heated to be within a predetermined temperature range. Thereafter, the current application to the workpiece W7 is terminated, in a state in which the second electrode 13 is separated from the workpiece W7, the second holder 11 is moved in the longitudinal direction of the workpiece W7 and the workpiece W7 is pulled in the longitudinal direction to make the workpiece flat. Then, quenching by rapid cooling is performed.

In a case of heating the plate workpiece W7 as described above, the plate workpiece W7 is divided into the first heating target region W7*a* and the second heating target region W7*b* and then heated, and thus each region can be formed into simplified shapes to facilitate heating. The first heating target region W7*a* of the two regions has the shape of which the width in the width direction slightly monotonically increases or decreases along the longitudinal direction. Thus, when the current flows in the longitudinal direction, the first heating target region has no constricted portion or expanded portion where the current does not smoothly flow along current-flowing path.

Accordingly, when the current is applied to the first heating target region W7*a* longitudinal direction so as to resistance heat the first heating target region, there is no site where current density distribution in the width direction varies excessively. Thus, when the first heating target region W7*a* is heated by direct resistance heating in accordance with a variation in the sectional area of the first heating target region W7*a* in the longitudinal direction, q wide range of the first heating target region W7*a* can be easily and uniformly heated, and the plate workpiece W7 can be efficiently heated in the longitudinal direction.

Further, when the first heating target region W7*a* is heated after the second heating target region W7*b* becomes an appropriate heated state, a wide combined area of the first heating target region W7*a* and second heating target region W7*b* can be heated to be within a predetermined temperature range. Furthermore, since respective regions are not required to be heated at the same time, the first heating target region W7*a* can be heated by direct resistance heating in the longitudinal direction, and the second heating target region W7*b* can be heated by a method that is suitable for the second heating target region W7*b*, it is possible to heat a wide combined area of the first heating target region W7*a* and the second heating target region W7*b* with a simple configuration.

Further, the plate workpiece W7 is formed such that the second heating target region W7*b* is adjoining a portion of the first heating target region W7*a* in the width direction and is provided integrally with the first heating target region. Thus, when the second heating target region W7*b* is first heated, the current-flowing path corresponding to the first heating target region W7*a* is formed in the plate workpiece W7. Accordingly, a wide area of the first heating target region W7*a* and the second heating target region W7*b* can be easily heated to be within a predetermined temperature range by uniformly heating the first heating target region W7*a* over the wide area by direct resistance heating in the longitudinal direction after heating the second heating target region W7*b* to an appropriate heated state.

The example has been described in which the boundary lines 80*x* are set by extending both side edges of the narrow portion 80, thereby setting the first heating target region W7*a*. However, the boundary lines 80*x* may be set such that the width of each longitudinal end of the first heating target region W7*a* is the same. In this case, when the first heating target region is heated by bringing the first electrode 12 and the second electrode 13 into contact with the first heating target region W7*a*, the electrodes are moved in a short period of time over the extended portions 81*x* more rapidly than other regions, thereby uniformly heating the entire region of the first heating target region. Further, even in a case where a region in which the sectional area in the width direction is constant along the longitudinal direction exists in another portion of the first heating target region W7*a*, for example, the first electrode 12 and the second electrode 13 are also moved in a short period of time over that portion more rapidly than over other portion, thereby uniformly heating the first heating target region W7*a*.

In the example illustrated in FIGS. 26A to 26E, portions having different properties are formed by partially heating the plate workpiece W7 in different temperature ranges and the cooling the workpiece. Specifically, the wide portion 81*b* is heated in a first temperature range, the remaining portion excluding the wide portion 81*b* is heated in a second temperature range higher than the first temperature range, and then the workpiece is cooled. Thus, the wide portion 81*b* and the remaining portion excluding the wide portion 81*b* have different properties.

The heating apparatus used in this example has the same as the heating apparatus used in the example illustrated in FIGS. 25A to 25D except that the second electrode 13 of the direct resistance heating apparatus 1 is different from that of the above example. In the direct resistance heating apparatus 1 of the heating apparatus used in FIGS. 25A to 25D, the second electrode 13 is formed to have a length that can extend across the entire width of the plate workpiece W7. Meanwhile, in the direct resistance heating apparatus 1 of this heating apparatus, as illustrated in FIGS. 26C and 26D, the second electrode 13 is formed to have a length which is shorter than the width of the wide portion 81*b* and corresponds to the maximum width of the first heating target region W7*a*.

Figure 26A:
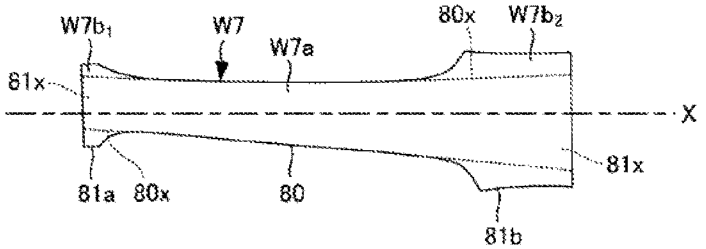
FIG. 26A is a diagram illustrating a heating apparatus and a heating method according to another embodiment of the present invention.
Figure 26B:
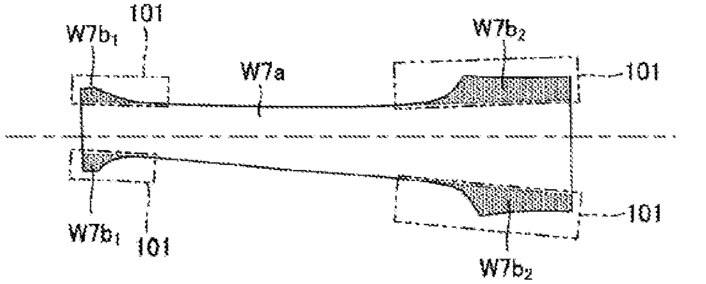
FIG. 26B is a diagram illustrating the heating apparatus and the heating method together with FIG. 26A.

To heat the plate workpiece W7 using this heating apparatus, as already illustrated in FIG. 26A, the first heating target region W7*a* and second heating target regions W7$b_1$ and W7$b_2$ of the plate workpiece W7 are set. Next, as illustrated in FIG. 26B, the second heating target regions W7$b_1$ and W7$b_2$ are respectively arranged and heated in the second heating section 101. At the time of heating, a pair of second heating target regions W7$b_1$ on one end may be heated to a high temperature higher than the second temperature range and the second heating target regions W7$b_2$ may be heated to a high temperature higher than the first temperature range. When the first heating target region W7*a* is maintained in a low temperature state and the second heating target regions W7$b_1$ and W7$b_2$ are heated in a high temperature state as described above, the resistance of the second heating target regions W7$b_1$ and W7$b_2$ is higher than the resistance of the first heating target region W7*a*, thereby forming current-flowing path for the subsequent direct resistance heating of the first heating target region W7*a*.

Figure 26C:
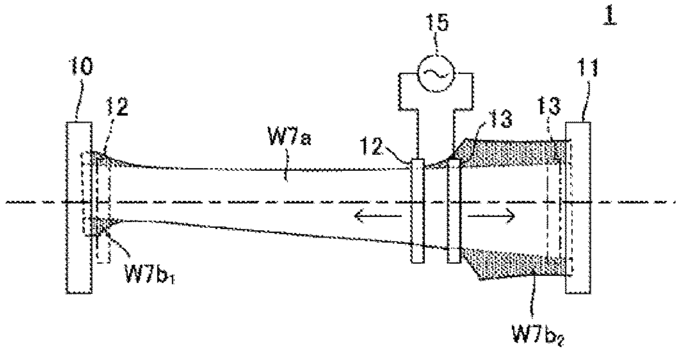
FIG. 26C is a diagram illustrating the heating apparatus and the heating method together with FIGS. 26A and 26B.
Figure 26D:
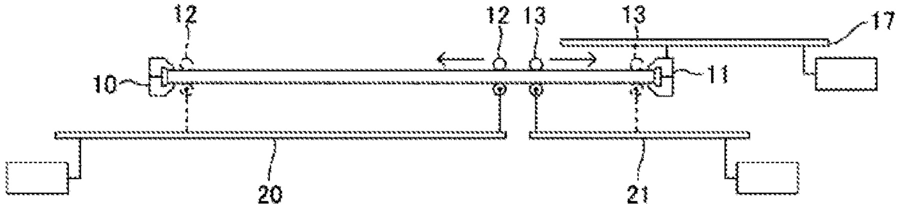
FIG. 26D is a diagram illustrating the heating apparatus and the heating method together with FIGS. 26A to 26C.

Next, as indicated by a solid line illustrated in FIGS. 26C and 26D, the first electrode 12 and the second electrode 13 of the direct resistance heating apparatus 1 are brought into contact with an intermediate portion of the first heating target region W7*a*, specifically, a portion adjacent to a boundary between the narrow portion 80 and the wide portion 81*b* of the plate workpiece W7. Here, the first electrode 12 and the second electrode 13 are respectively arranged substantially perpendicular and substantially in parallel to the longitudinal direction so as to extend across the first heating target region W7*a*. While applying current from the power supply 15 to the first electrode 12 and the second electrode 13, the first electrode 12 and the second electrode 13 are moved, and thus the first heating target region W7*a* is heated by direct resistance heating over the entire length in the longitudinal direction. The first electrode 12 is moved toward one side by the first moving unit 20 and the second electrode 13 is moved toward the other side by the second moving unit 21. Accordingly, at an initial direct resistance heating stage, current is applied to a partial range of the first heating target region W7*a* in the longitudinal direction, and the first electrode 12 and the second electrode 13 are separated from each other to widen the current-applying range. At a final heating stage, the current is applied to the first heating target region W7*a* over the substantially entire length.

At this time, the moving order, moving speed or the like when the first electrode 12 and the second electrode 13 are moved may be controlled according to various heating conditions such as a shape, a target temperature range, or the like of the first heating target region W7*a*. For the moving order, for example, the first electrode 12 and the second electrode 13 may be moved at the same time, or the first electrode 12*a* which requires a long period of time may be first moved and then the second electrode 13 may be moved. For the moving speed, for example, the first electrode 12 and the second electrode 13 may be moved at different speeds, and the second electrode 13 may be moved at a variable speed according to a variation in the sectional area in the width direction of the first heating target region W7*a* in the longitudinal direction.

The current-applying time at each location in the longitudinal direction is adjusted by controlling the moving order, moving speed, or the like of the first electrode 12 and the second electrode 13 such that the current-applying time of a portion having a large sectional area is increased and the current-applying time of a portion having a small sectional area is decreased to heat each location of the first heating target region W7*a* in a target heating temperature range. Here, the first heating target region W7*a* of the wide portion 81*b* is heated in a first temperature range and the first heating target region W7*a* of the remaining portion is heated to a second temperature range.

Figure 26E:
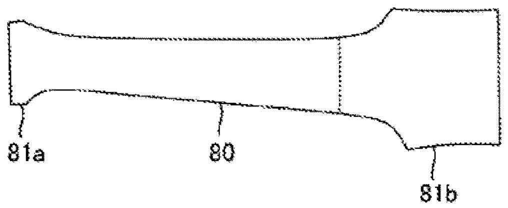
FIG. 26E is a diagram illustrating the heating apparatus and the heating method together with FIGS. 26A to 26D.

As described above, since the second heating target regions W7$b_1$ and W7$b_2$ are heated in advance when each location of the first heating target region W7*a* is heated, the heating temperature of the second heating target regions W7$b_1$ and W7$b_2$, the heating timing of the first heating target region W7*a*, and the like are appropriately controlled so that as indicated by a broken line in FIG. 26E, the entire wide portion 81*b* can be heated in the first temperature range, the entire remaining portion can be heated in the second temperature range, and thus a plurality of temperature regions can be formed in the plate workpiece W7. Thereafter, the current application to the workpiece W7 is terminated, in a state in which the second electrode 13 is separated from the workpiece W7, the second holder 11 is moved in the longitudinal direction of the workpiece W7, and the workpiece W7 is pulled in the longitudinal direction to make the workpiece flat. Then, the workpiece is rapidly cooled to complete the quenching.

In the example, as the plate workpiece W7, a plate workpiece of which thickness is generally constant is used. However, a tailored blank in which a region having different thicknesses is provided can also be used. For example, a plate workpiece W7 in which the wide portion 81*b* and the remaining portion have different thicknesses may be heated in the same manner. In this case, it is easy to heat the wide portion 81*b* and the remaining portion in the same temperature range. Even when the workpiece has a uniform thickness, the entire workpiece may be heated in the same temperature range in the same manner.

Figure 27A:
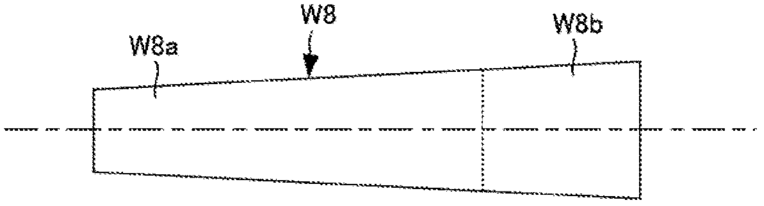
FIG. 27A is a diagram illustrating a heating apparatus and a heating method according to another embodiment of the present invention.
Figure 27B:
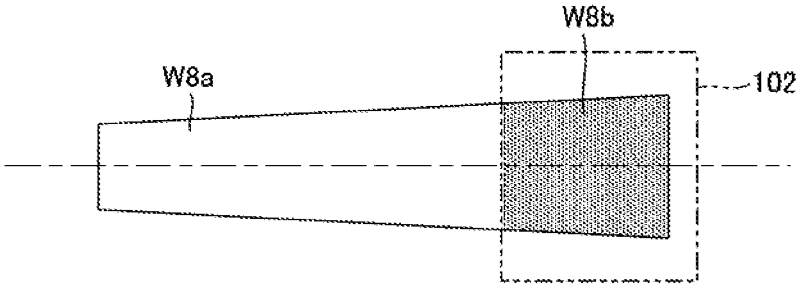
FIG. 27B is a diagram illustrating the heating apparatus and the heating method together with FIG. 27A.
Figure 27C:
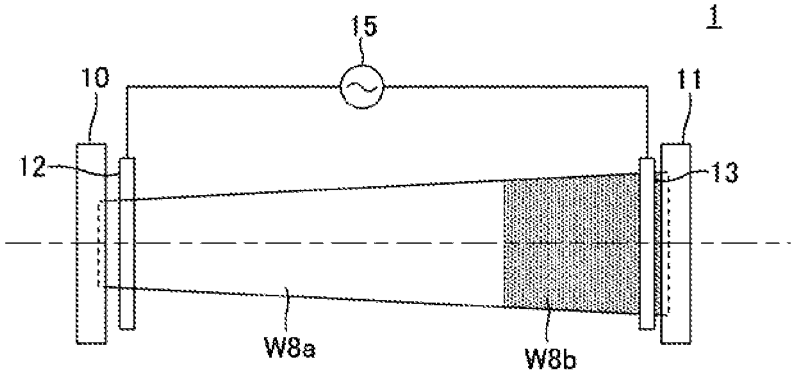
FIG. 27C is a diagram illustrating the heating apparatus and the heating method together with FIGS. 27A and 27B.

In the example illustrated in FIGS. 27A to 27C, an entire plate workpiece W8 to be heated has a substantially constant thickness, is formed into a substantially trapezoidal shape as illustrated in FIG. 27A, and has a first heating target region W8*a* in which the sectional area in the width direction monotonically increases or monotonically decreases along the longitudinal direction and a second heating target region W8*b* having a width wider than the width of the first heating target region W8*a*.

As illustrated in FIGS. 27B and 27, a heating apparatus for heating the plate workpiece W8 includes a second heating section 102 (an example of a partial heating section) configured to heat the second heating target region W8*b* and the direct resistance heating apparatus 1 as a first heating section (an example of an overall heating section) configured to the first heating target region W8*a* and the second heating target region W8*b*.

As illustrated in FIG. 27B, the second heating section 102 is designed to restrict heating of the first heating target region W8*a* when heating the second heating target region W8*b*. For example, the second heating section may heat the second region by direct resistance heating using a pair of electrodes by bringing the electrodes into contact with the second heating target region W8*b*, may be heated by induction heating by moving a coil close to the second heating target region W8*b*, or may be heated by furnace heating by placing and heating a part of the second heating target region W8*b* in a heating furnace. Further, the second heating target region can be heated by bringing a heater, which is heated up to a predetermined temperature, into contact with the second heating target region. In this example, only the second heating target region W8*b* is placed in a heating furnace and heated.

The plate workpiece W8 is heated using such a heating apparatus in the following manner. First, as illustrated in FIG. 27A, the first heating target region W8*a* and the second heating target region W8*b* of the plate workpiece W8 are set so that the heating target regions can be heated as uniform as possible. Here, in a case where the sectional area in the width direction is increased and direct resistance heating is performed by the first electrode 12 and the second electrode 13 of the direct resistance heating apparatus 1, a portion in which sufficient current density is difficult to obtain is set to the second heating target region W8*b* and a portion in which the sectional area in the width direction is smaller than the sectional area of the second heating target region W8*b* is set to the first heating target region W8*a*.

Next, as illustrated in FIG. 27B, the second heating target region W8*b* is arranged in the second heating section 102 to heat the second heating target region W8*b*. A part of the second heating target region W8*b* is placed and heated in a heating furnace used as the second heating section 102. Preheating may be performed up to an appropriate temperature lower than a target temperature range for heating.

After the second heating target region W8*b* is heated, as illustrated in FIG. 27C, the first electrode 12 and the second electrode 13 of the direct resistance heating apparatus 1 are brought into contact with the surfaces of both ends of the plate workpiece W8. Then, current is fed from the power supply 15 and flows between the first electrode 12 and the second electrode 13 so that the electrodes carry out direct resistance heating in the longitudinal direction. At this time, when the current is applied under the condition that the first heating target region W8*a* is heated in a predetermined temperate range, the second heating target region W8*b* has an amount of heat generated per unit area smaller than that of the first heating target region W8*a* since the second heating target region has a wider width. Since the second heating target region W8*b* however is appropriately preheated, the entire first heating target region W8*a* and the entire second heating target region W8*b* can be heated to be within a predetermined temperature range by direct resistance heating. Thereafter, the current application to the workpiece W8 is terminated, in a state in which the second electrode 13 is separated from the workpiece W8, the second holder 11 is moved in the longitudinal direction of the workpiece W8, and the workpiece W8 is pulled in the longitudinal direction to make the workpiece flat. Then, quenching is performed by subsequent rapid cooling.

According to the heating method and the heating apparatus as described above, since the plate workpiece W8 is heated separately for a plurality of regions, i.e., the first heating target region W8*a* and the second heating target region W8*b* adjoining a portion of the first heating target region W8*a*, each region can be formed into simplified shapes to facilitate heating. Since the workpiece W8 has a shape in which the sectional area in the width direction of the first heating target region W8*a* and the second heating target region W8*b* in the width direction monotonically increases or monotonically decreases along the longitudinal direction, when the current flows in the longitudinal direction, the workpiece has no constricted portion or expanded portion where the current does not smoothly flow in the current-flowing path. Therefore, when the first heating target region W8*a* is heated by direct resistance heating in accordance with a variation in the sectional area in the longitudinal direction, a wide area of the first heating target region W8*a* can be easily and uniformly heated. Thereby, the plate workpiece W8 can be efficiently heated in the longitudinal direction.

Further, the second heating target region W8*b* that is wider than the first heating target region W8*a* is adjoining the first heating target region W8*a* in the longitudinal direction of the plate workpiece W8 in a monolithic manner. Thus, when the second heating target region W8*b* is first preheated by heating and the entire regions along the entire length is heated by direct resistance heating, the entire plate workpiece W8 does not need to be preheated and it is easy to perform direct resistance heating in the longitudinal direction. As a result, the second heating section 102 can be miniaturized, and the entire apparatus can be made compact.

Although the plate workpiece W8 which has a substantially trapezoidal shape in which the sectional area of the first heating target region W8*a* and the second heating target region W8*b* in the width direction monotonically increases or monotonically decreases in one direction of the longitudinal direction has been described, the present invention is not limited thereto. For example, the present invention can of course be adapted to the workpiece in which the first heating target region W8*a* and the second heating target region respectively have sectional areas that are different in the width direction, but are substantially uniform in the longitudinal direction.

The above-described heating method can be used in hot-press press molding in which the workpiece in a high temperature state after heating is molded by pressing using a press mold. According to the above-described heating method, it is sufficient to configure the heating equipment only with a simple construction, and thus the heating equipment can be provided adjacent to or integrally with the press machine. Therefore, the workpiece can be press-molded in a short period of time after being heated and temperature drop of the heated workpiece is suppressed to reduce energy loss. In addition, it is possible to prevent surface oxidation of the workpiece, thereby preparing a high quality press-molded article.

This application claims priority to Japanese Patent Application No. 2017-174053 filed on Sep. 11, 2017, the entire content of which is incorporated herein by reference.

The invention claimed is:

1. A direct resistance heating apparatus comprising:

a first electrode and a second electrode arranged to oppose to each other with a space provided between the first electrode and the second electrode;

a power supply electrically connected to the first electrode and the second electrode;

an electrode moving mechanism configured to move, in a state in which the first electrode and the second electrode are in contact with a workpiece and in a state in which current is applied from the power supply to the workpiece through the first electrode and the second electrode, at least one of the first electrode or the second electrode along an opposing direction in which the first electrode and the second electrode are opposed to each other;

a first holder and a second holder configured to hold the workpiece such that, in a state in which the at least one of the first electrode or the second electrode is moved, a heating target region of the workpiece located between the first electrode and the second electrode is held between the first holder and the second holder in the opposing direction; and a holder moving mechanism configured to move at least one of the first holder or the second holder to pull the workpiece along the opposing direction, wherein the first holder and the second holder are configured separately from the first electrode and the second electrode.

2. The direct resistance heating apparatus according to claim 1, wherein the holder moving mechanism moves, in a state in which one of the first electrode or the second electrode is separated from the workpiece, one of the first holder or the second holder that is arranged closer to the one of the first electrode or the second electrode separated from the workpiece.

3. The direct resistance heating apparatus according to claim 1, wherein the first electrode and the second electrode each has a length that extends across the heating target region of the workpiece.

4. The direct resistance heating apparatus according to claim 1, further comprising a controller configured to control at least one of a moving speed of the at least one of the first electrode or the second electrode moved by the electrode moving mechanism or an amount of current passing through the workpiece.

5. The direct resistance heating apparatus according to claim 4, wherein the controller is configured to control at least one of the moving speed or the amount of current passing through the workpiece based on a shape and a size of the workpiece.

6. The direct resistance heating apparatus according to claim 1, further comprising a first bus bar and a second bus bar that are arranged along the workpiece and electrically connected to the power supply, wherein the first electrode is movable in a state in which the first electrode is in contact with the first bus bar and the workpiece, and the second electrode is movable in a state in which the second electrode is in contact with the second bus bar and the workpiece.

7. The direct resistance heating apparatus according to claim 6, wherein each of the first electrode and the second electrode comprises a current-applying roller configured to roll on a surface of the workpiece, the current-applying roller of the first electrode being disposed between the first bus bar and the workpiece, and the current-applying roller of the second electrode being disposed between the second bus bar and the workpiece, and wherein the current-applying rollers each comprise an electrically conductive peripheral surface from which the current is applied to the surface of the workpiece.

8. The direct resistance heating apparatus according to claim 7, wherein each of the first electrode and the second electrode further comprises a power feeding roller from which the current is applied to the current-applying roller, the power feeding roller of the first electrode being configured to roll on a surface of first bus bar and to move together with the current-applying roller of the first electrode, and the power feeding roller of the second electrode being configured to roll on a surface of second bus bar and to move together with the current-applying roller of the second electrode.

9. The direct resistance heating apparatus according to claim 8, wherein the power feeding rollers each have an electrically conductive peripheral surface from which the current is applied to a corresponding one of the current-applying rollers.

10. The direct resistance heating apparatus according to claim 9, wherein the current-applying roller and the power feeding roller of each of the first electrode and the second electrode rotate in opposite directions in a mutually contacting manner.

11. The direct resistance heating apparatus according to claim 10, wherein, for at least one of the first electrode or the second electrode, an axis of the power feeding roller is arranged at a location shifted from a plane including a line of contact between the current-applying roller and the workpiece and an axis of the current-applying roller.

12. The direct resistance heating apparatus according to claim 8, wherein, for at least one of the first electrode or the second electrode, the power feeding roller is arranged at each axial end of the current-applying roller.

13. The direct resistance heating apparatus according to claim 7, further comprising an electrically-conductive brushes provided on surfaces of the first bus bar and the second bus bar that face toward the workpiece, and the current-applying rollers are each configured to slide on a corresponding one of the electrically-conductive brushes in contact with the corresponding one of the electrically-conductive brushes.

14. The direct resistance heating apparatus according to claim 7, wherein each of the first electrode and the second electrode further comprises a pressing member arranged to oppose to the current-applying roller and configured to move together with the current-applying roller, and wherein the pressing members are configured to press the workpiece against the current-applying rollers.

15. A heating apparatus configured to heat a plate workpiece having a first heating target region and a second heating target region, wherein a sectional area of the first heating target region is substantially constant along a longitudinal direction of the first heating target region or monotonically increases or decreases along the longitudinal direction, and wherein the second heating target region adjoins a portion of the first heating target region in a width direction of the first heating target region in a monolithic manner, the heating apparatus comprising:

a first heating section configured to heat the first heating target region; and a second heating section configured to heat the second heating target region, wherein the first heating section comprises the direct resistance heating apparatus according to claim 1, and at least one of the first electrode or the second electrode of the direct resistance heating apparatus is moved on the first heating target region in the longitudinal direction.

16. A heating apparatus configured to heat a plate workpiece having a first heating target region and a second heating target region, wherein a sectional area of the first heating target region is substantially constant along a longitudinal direction of the first target heating region or monotonically increases or decreases along the longitudinal direction, and wherein the second heating target region adjoins the first heating target region in the longitudinal direction in a monolithic manner, the second heating target region being wider than the first heating target region, the heating apparatus comprising:

a partial heating section configured to heat the second heating target region; and an overall heating section configured to heat the first heating target region and the second heating target region, wherein the overall heating section comprises the direct resistance heating apparatus according to claim 1, and at least one of the first electrode or the second electrode of the direct resistance heating apparatus is moved in the longitudinal direction of the plate workpiece.

17. A direct resistance heating method comprising:

heating a workpiece by direct resistance heating; and flattening the workpiece that has been expanded due to the direct resistance heating by pulling the workpiece, wherein the direct resistance heating comprises:

moving at least one of a first electrode or a second electrode arranged to oppose to each other with a space provided between the first electrode and the second electrode, along an opposing direction in which the first electrode and the second electrode are opposed to each other, in a state in which the first electrode and the second electrode are in contact with the workpiece and in a state in which current is applied to the workpiece through the first electrode and the second electrode, and wherein the pulling of the workpiece comprises:

holding the workpiece by a first holder and a second holder such that, in a state in which the at least one of the first electrode or the second electrode is moved, a heating target region of the workpiece located between the first electrode and the second electrode is held between the first holder and the second holder in the opposing direction; and moving at least one of the first holder or the second holder along the opposing direction, wherein the first holder and the second holder are configured separately from the first electrode and the second electrode.

18. The direct resistance heating method according to claim 17, wherein the moving of the at least one of the first holder or the second holder comprises moving, in a state in which one of the first electrode or the second electrode is separated from the workpiece, one of the first holder or the second holder that is arranged closer to the one of the first electrode or the second electrode separated from the workpiece.

19. A hot-press molding method comprising:

heating the heating target region of the workpiece by the direct resistance heating method according to claim 17; and pressing the workpiece by a press mold.

20. A direct resistance heating apparatus comprising:

a first electrode and a second electrode arranged to oppose to each other with a space provided between the first electrode and the second electrode;

a power supply electrically connected to the first electrode and the second electrode;

an electrode moving mechanism configured to move, in a state in which the first electrode and the second electrode are in contact with a workpiece and in a state in which current is applied from the power supply to the workpiece through the first electrode and the second electrode, at least one of the first electrode or the second electrode along an opposing direction in which the first electrode and the second electrode are opposed to each other;

a first holder and a second holder configured to hold the workpiece such that, in a state in which the at least one of the first electrode or the second electrode is moved, a heating target region of the workpiece located between the first electrode and the second electrode is held between the first holder and the second holder in the opposing direction;

a holder moving mechanism configured to move at least one of the first holder or the second holder to pull the workpiece along the opposing direction; and a first bus bar and a second bus bar that are arranged along the workpiece and electrically connected to the power supply, wherein the first electrode is movable in a state in which the first electrode is in contact with the first bus bar and the workpiece, and the second electrode is movable in a state in which the second electrode is in contact with the second bus bar and the workpiece, wherein each of the first electrode and the second electrode comprises a current-applying roller configured to roll on a surface of the workpiece, the current-applying roller of the first electrode being disposed between the first bus bar and the workpiece, and the current-applying roller of the second electrode being disposed between the second bus bar and the workpiece, and wherein the current-applying rollers each comprise an electrically conductive peripheral surface from which the current is applied to the surface of the workpiece.

* * * * *